(12) United States Patent
Park et al.

(10) Patent No.: US 11,011,746 B2
(45) Date of Patent: May 18, 2021

(54) COMPOSITE CATHODE ACTIVE MATERIAL FOR LITHIUM BATTERY, CATHODE FOR LITHIUM BATTERY INCLUDING THE SAME, AND LITHIUM BATTERY INCLUDING THE CATHODE

(71) Applicants: Samsung Electronics Co., Ltd., Suwon-si (KR); Samsung SDI Co., Ltd., Yongin-si (KR)

(72) Inventors: Kwangjin Park, Seongnam-si (KR); Junho Park, Seoul (KR); Jaegu Yoon, Suwon-si (KR); Sukgi Hong, Seongnam-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 240 days.

(21) Appl. No.: 15/207,885

(22) Filed: Jul. 12, 2016

(65) Prior Publication Data

US 2017/0018767 A1 Jan. 19, 2017

(30) Foreign Application Priority Data

Jul. 13, 2015 (KR) .................. 10-2015-0099224
Jul. 7, 2016 (KR) .................. 10-2016-0086181

(51) Int. Cl.
*H01M 4/36* (2006.01)
*H01M 4/485* (2010.01)
(Continued)

(52) U.S. Cl.
CPC ............ *H01M 4/366* (2013.01); *C01F 7/043* (2013.01); *C01G 53/50* (2013.01); *H01M 4/0402* (2013.01); *H01M 4/0404* (2013.01); *H01M 4/0435* (2013.01); *H01M 4/0471* (2013.01); *H01M 4/131* (2013.01); *H01M 4/1391* (2013.01); *H01M 4/364* (2013.01);
(Continued)

(58) Field of Classification Search
None
See application file for complete search history.

(56) References Cited

U.S. PATENT DOCUMENTS

| 5,575,202 A | 11/1996 | Pfeiffer |
| 6,677,082 B2 | 1/2004 | Thackeray et al. |

(Continued)

FOREIGN PATENT DOCUMENTS

| CN | 101156260 A | 4/2008 |
| CN | 101414680 A | 4/2009 |

(Continued)

OTHER PUBLICATIONS

STIC translation of KR 10-2015-0021809 previously provided as a machine translation. Published Mar. 3, 2015. (Year: 2015).*

(Continued)

*Primary Examiner* — Amanda J Barrow
(74) *Attorney, Agent, or Firm* — Cantor Colburn LLP

(57) ABSTRACT

A composite cathode active material for a lithium battery including: a lithium composite oxide; and a coating layer including a metal oxide and a lithium fluoride, (LiF) wherein the coating layer is disposed on at least a portion of a surface of the lithium composite oxide.

26 Claims, 29 Drawing Sheets

(9 of 29 Drawing Sheet(s) Filed in Color)

(51) Int. Cl.

| | | |
|---|---|---|
| *H01M 4/58* | (2010.01) | |
| *H01M 4/04* | (2006.01) | |
| *H01M 10/0569* | (2010.01) | |
| *H01M 4/1391* | (2010.01) | |
| *H01M 4/62* | (2006.01) | |
| *H01M 2/16* | (2006.01) | |
| *H01M 10/0525* | (2010.01) | |
| *H01M 10/0568* | (2010.01) | |
| *H01M 4/505* | (2010.01) | |
| *H01M 4/131* | (2010.01) | |
| *H01M 4/525* | (2010.01) | |
| *C01G 53/00* | (2006.01) | |
| *C01F 7/04* | (2006.01) | |
| *H01M 50/44* | (2021.01) | |
| *H01M 50/411* | (2021.01) | |
| *H01M 4/02* | (2006.01) | |

(52) U.S. Cl.
CPC .......... *H01M 4/485* (2013.01); *H01M 4/505* (2013.01); *H01M 4/525* (2013.01); *H01M 4/582* (2013.01); *H01M 4/5825* (2013.01); *H01M 4/623* (2013.01); *H01M 4/625* (2013.01); *H01M 10/0525* (2013.01); *H01M 10/0568* (2013.01); *H01M 10/0569* (2013.01); *H01M 50/411* (2021.01); *H01M 50/44* (2021.01); *C01P 2004/04* (2013.01); *C01P 2006/40* (2013.01); *H01M 2004/021* (2013.01); *H01M 2004/028* (2013.01); *H01M 2220/20* (2013.01); *H01M 2220/30* (2013.01); *H01M 2300/0034* (2013.01); *H01M 2300/0037* (2013.01); *Y02T 10/70* (2013.01)

(56) References Cited

U.S. PATENT DOCUMENTS

| | | | |
|---|---|---|---|
| 6,680,143 B2 | 1/2004 | Thackeray et al. | |
| 7,303,840 B2 | 12/2007 | Thackeray et al. | |
| 7,479,352 B2 | 1/2009 | Yoon et al. | |
| 7,927,506 B2 | 4/2011 | Park | |
| 8,366,968 B2 * | 2/2013 | Suzuki .................. | H01M 4/131 |
| | | | 252/500 |
| 8,449,792 B2 | 5/2013 | Chang et al. | |
| 8,465,873 B2 | 6/2013 | Lopez et al. | |
| 8,535,832 B2 * | 9/2013 | Karthikeyan ......... | H01M 4/366 |
| | | | 252/182.1 |
| 8,771,876 B2 | 7/2014 | Watanabe et al. | |
| 8,877,377 B2 | 11/2014 | Hosoya | |
| 9,048,495 B2 | 6/2015 | Sun et al. | |
| 9,887,420 B2 | 2/2018 | Park et al. | |
| 9,972,834 B2 | 5/2018 | Kong et al. | |
| 10,170,763 B2 | 1/2019 | Blangero et al. | |
| 2006/0068289 A1 | 3/2006 | Paulsen et al. | |
| 2009/0087362 A1 | 4/2009 | Sun et al. | |
| 2009/0087746 A1 | 4/2009 | Kang et al. | |
| 2009/0104532 A1 * | 4/2009 | Hosoya ................. | H01M 4/366 |
| | | | 429/224 |
| 2009/0220859 A1 | 9/2009 | Yoon et al. | |
| 2009/0272939 A1 * | 11/2009 | Sun ..................... | C01G 45/1242 |
| | | | 252/182.1 |
| 2010/0151332 A1 | 6/2010 | Lopez et al. | |
| 2011/0076556 A1 | 3/2011 | Karthikeyan et al. | |
| 2012/0282521 A1 * | 11/2012 | Choi ..................... | H01M 4/366 |
| | | | 429/211 |
| 2013/0130103 A1 | 5/2013 | Kim et al. | |
| 2014/0162127 A1 * | 6/2014 | Kim ...................... | H01M 4/525 |
| | | | 429/224 |
| 2014/0193714 A1 | 7/2014 | Kim et al. | |
| 2015/0104704 A1 | 4/2015 | Kim et al. | |
| 2015/0147655 A1 | 5/2015 | Park et al. | |
| 2015/0180023 A1 * | 6/2015 | Xiao ..................... | H01M 4/582 |
| | | | 429/231 |
| 2015/0188187 A1 * | 7/2015 | Strand .................. | H01M 10/056 |
| | | | 429/317 |
| 2015/0287984 A1 | 10/2015 | Kong et al. | |
| 2016/0276658 A1 * | 9/2016 | Choi ..................... | H01M 4/364 |
| 2019/0051895 A1 * | 2/2019 | Han ...................... | H01M 4/366 |

FOREIGN PATENT DOCUMENTS

| | | | | |
|---|---|---|---|---|
| CN | 103635431 A | | 3/2014 | |
| CN | 104584284 A | | 4/2015 | |
| EP | 3041071 A1 | | 7/2016 | |
| KR | 10-0814826 | * | 3/2008 | .......... H01M 4/362 |
| KR | 1020080031616 A | | 4/2008 | |
| KR | 1020080054708 A | | 6/2008 | |
| KR | 1020090093165 A | | 9/2009 | |
| KR | 1020120124779 A | | 11/2012 | |
| KR | 1020130055441 A | | 5/2013 | |
| KR | 1020140018137 A | | 2/2014 | |
| KR | 1020140147049 A | | 12/2014 | |
| KR | 10-2015-0021809 | * | 3/2015 | .......... H01M 4/525 |
| KR | 1020150021809 A | | 3/2015 | |
| WO | 2014204213 A1 | | 12/2014 | |

OTHER PUBLICATIONS

Sun et al., "The Role of AlF3 Coatings in Improving Electrochemical Cycling of Li-Enriched Nickel-Manganese Oxide Electrodes for Li-Ion Batteries," Adv. Mater. 2012, 24, 1192-1196, Published Jan. 25, 2012 (Year: 2012).*

Park et al., "The synergistic effect of inert oxide and metal fluoride dual coatings on advanced cathode materials for lithium ion battery applications," Phys. Chem. Chem. Phys., 2016 18, 15861-15866, Published May 27, 2016 (Year: 2016).*

Liu et al, "Understanding the Role of NH4F and Al2O3 Surface Co-modification on Lithium-Excess Layered Oxide Li1.2NI0.2Mn0.6O2," ACS Appl. Mater. Interfaces 2015, 7, 19189-19200, Published Aug. 19, 2015 (Year: 2015).*

Julien, "Comparative Issues of Cathode Materials for Li-Ion Batteries," Inorganics, 2014, 2, 132-154, Published Mar. 25, 2014 (copy provided). (Year: 2014).*

European Search Report for European Patent Application No. 16178994.6 dated Dec. 13, 2016.

Liu et al.., "Understanding the Role of NH4F and Al2O3 Surface Co-modification on Lithium-Excess Layered Oxide Li1.2Ni0.2Mn0.6O2", Appl. Mater. Interfaces, vol. 7, 2015, pp. 19189-19200.

Park et al., "The synergistic effect of inert oxide and metal fluoride dual coatings on advanced cathode materials for lithium ion battery applications*", Phys. Chem. Chem. Phys., 18, 2016, 15861.

Wu et al., "Simultaneous surface coating and chemical activation of the Li-rich solid solution lithium rechargeable cathode and its improved performance", Electrochimica Acta, 113, 2013, pp. 54-62.

Chao Lu et al., "Cerium fluoride coated layered oxide Li1.2Mn0.54Ni0.13Co0.13O2 as cathode materials with improved electrochemical performance for lithium ion batteries," Journal of Power Sources, 2014, pp. 1-40, DOI: 10.1016/j.jpowsour.2014.05.122.

Office Action dated Aug. 5, 2020 of Chinese Patent Application No. 201610547526.0.

* cited by examiner

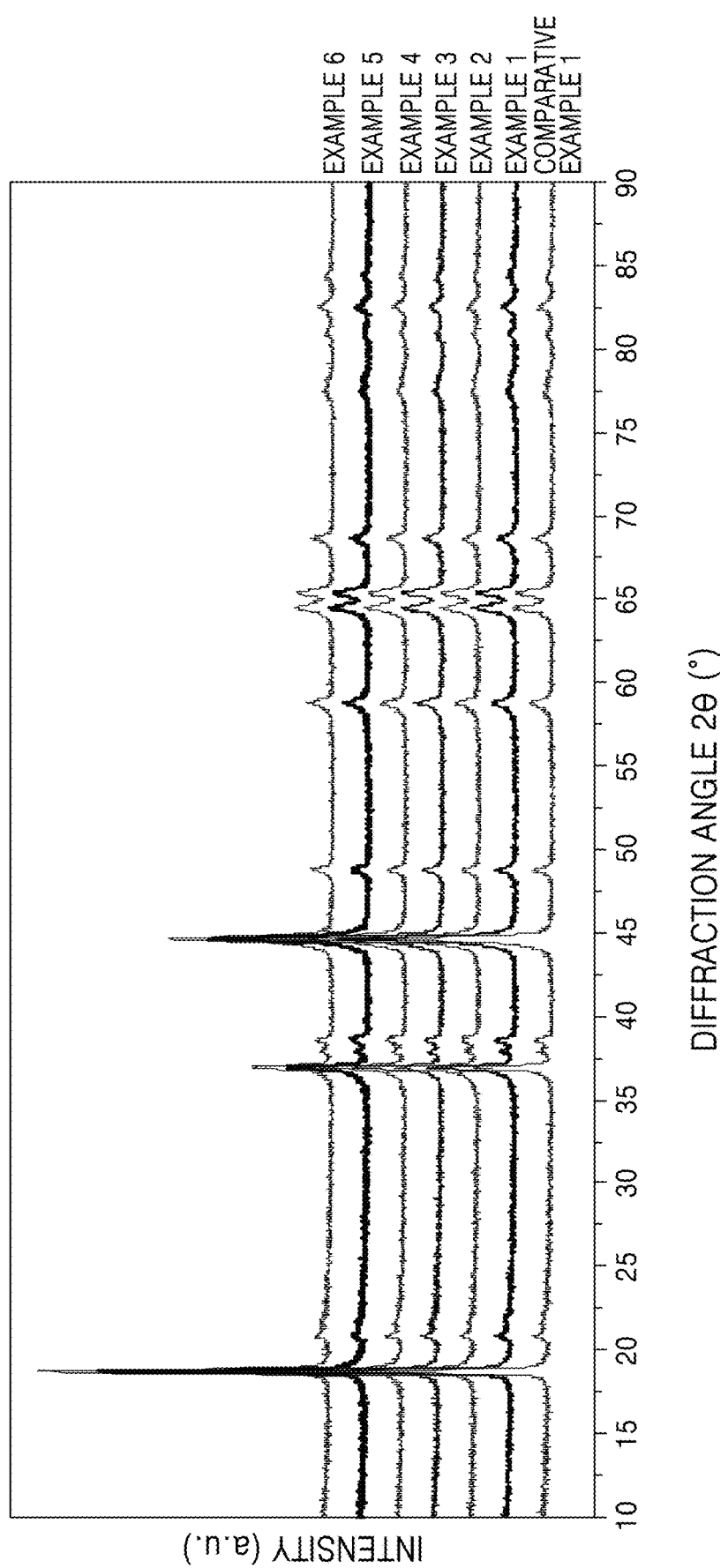

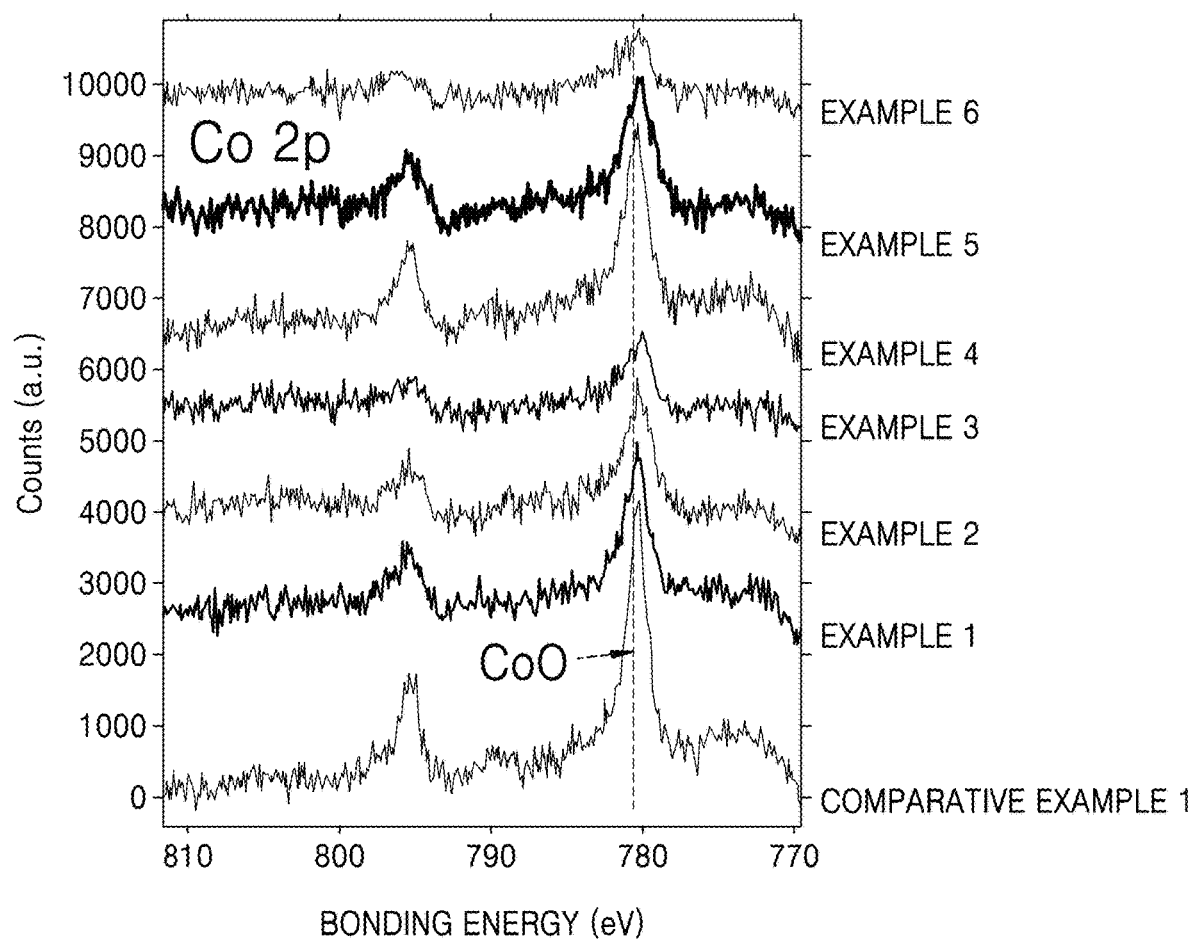

FFT of red box

COMPOSITE CATHODE ACTIVE MATERIAL FOR LITHIUM BATTERY, CATHODE FOR LITHIUM BATTERY INCLUDING THE SAME, AND LITHIUM BATTERY INCLUDING THE CATHODE

CROSS-REFERENCE TO RELATED APPLICATION

This application claims priority to and the benefit of Korean Patent Application No. 10-2015-0099224, filed on Jul. 13, 2015, and Korean Patent Application No. 10-2016-0086181, filed on Jul. 7, 2016, in the Korean Intellectual Property Office, and all the benefits accruing therefrom under 35 U.S.C. § 119, the contents of which are incorporated herein in their entirety by reference.

BACKGROUND

1. Field

The present disclosure relates to a composite cathode active material for a lithium battery, a cathode for a lithium battery including the composite cathode active material, and a lithium battery including the cathode.

2. Description of the Related Art

Lithium batteries have been used as a power supply for operating vehicles as well as portable electronic devices, and thus efforts have been made to improve the capacity of the lithium battery. Also, as various devices have become more complex and perform multiple functions, the demand for increasing a voltage of a lithium battery which is used as an energy source of a device has increased. The demand to reduce the size and weight of the lithium battery has also increased.

In order to manufacture a lithium battery having increased voltage, as well as decreased size and weight, it would be desirable to have a cathode active material having improved cycle characteristics and rate capability.

SUMMARY

Provided is a cathode active material for a lithium battery. The cathode active material remains structurally stable during repeated charging/discharging of the lithium battery.

Provided also is a method of preparing the cathode active material.

Provided is a cathode for a lithium battery including the cathode active material, as well as a lithium battery including the cathode.

According to an aspect of an exemplary embodiment, a composite cathode active material for a lithium battery includes a lithium composite oxide; and a coating layer including a metal oxide and a lithium fluoride, wherein the coating layer is disposed on at least a portion of a surface of the lithium composite oxide.

According to an aspect of another exemplary embodiment, a method of preparing a composite cathode active material for a lithium battery includes mixing a metal oxide precursor, a lithium composite oxide, a fluoride precursor, and a solvent to prepare a reaction product; drying the reaction product; and heat-treating the dried reaction product to prepare the composite cathode active material, wherein the composite cathode active material comprises a lithium composite oxide, and a coating layer including a metal oxide and a lithium fluoride disposed on at least a portion of a surface of the lithium composite oxide.

According to an aspect of another exemplary embodiment, a method of preparing a composite cathode active material for a lithium battery includes mixing a lithium composite oxide, at least one selected from a fluoride precursor and a metal oxide precursor, and a solvent to prepare a first reaction product; drying the first reaction product; heat-treating the dried first reaction product; mixing the heat-treated and dried first reaction product, at least one selected from a fluoride precursor and a metal oxide precursor, and a solvent to prepare a second reaction product; drying the second reaction product; and heat-treating the dried second reaction product to prepare a composite cathode active material comprising a lithium composite oxide and a coating layer including a lithium fluoride and a metal oxide, wherein the lithium fluoride and the metal oxide are sequentially disposed on a surface of the lithium composite oxide.

According to an aspect of another exemplary embodiment, a cathode for a lithium battery includes the composite cathode active material.

According to an aspect of another exemplary embodiment, a lithium battery includes the cathode.

Additional aspects will be set forth in part in the description which follows and, in part, will be apparent from the description, or may be learned by practice of the presented exemplary embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and/or other aspects will become apparent and more readily appreciated from the following description of the exemplary embodiments, taken in conjunction with the accompanying drawings in which:

FIG. 4A is a graph of intensity (arbitrary units, a.u.) versus diffraction angle (degrees two-theta, $2\theta$) which shows the results of X-ray powder diffraction (XRD) analysis using CuK$\alpha$ radiation performed on the composite cathode active materials prepared in Examples 1 to 6 and a cathode active material prepared in Comparative Example 1;

FIGS. 5A to 5J are graphs of counts per second (CPS) versus bonding energy (electron volts, eV) which show the results of X-ray photoelectron spectroscopy (XPS) analysis performed on the composite cathode active materials prepared in Examples 1 to 6 and the cathode active material prepared in Comparative Example 1;

DETAILED DESCRIPTION

Figure 1:
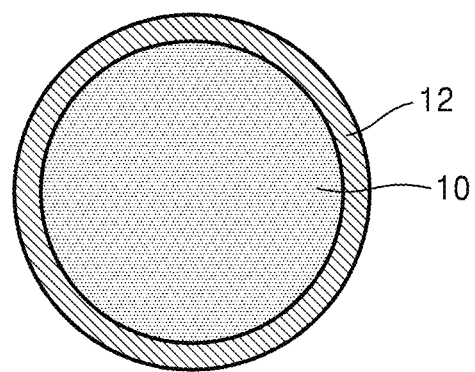
FIG. 1 is a schematic view of a structure of a composite cathode active material for a lithium battery, according to an exemplary embodiment.

Reference will now be made in detail to exemplary embodiments of a composite cathode active material, a method of preparing in the composite cathode active material, a cathode including the composite cathode active material, and a lithium battery including the cathode, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

According to an exemplary embodiment, provided is a composite cathode active material for a lithium battery that includes a lithium composite oxide 10; and a coating layer 12 including a metal oxide and a lithium fluoride disposed on at least a portion of a surface of the lithium composite oxide (see FIG. 1).

During charging/discharging of the lithium battery, a side reaction between an electrolyte and a cathode active material may occur. As a result of the side-reaction between the electrolyte and cathode active material, a structure of a cathode active material may be changed, and, during high-voltage charging of the battery, the capacity and cycling characteristics of the battery may deteriorate. The composite cathode active material, according to an embodiment, includes a coating layer including the metal oxide and lithium fluoride on a surface of the lithium composite oxide to minimize direct contact between an electrolyte and the cathode active material, so that the side reaction is suppressed and a change in the structure of the cathode active material is also suppressed. Thus, when a lithium battery includes a cathode including the exemplary composite cathode active material, the high rate characteristics and cycle characteristics of the lithium battery may be improved. Also, when the coating layer is formed, a spinel phase is present between the lithium composite oxide and the coating layer, and thus an electrical conductivity of the composite cathode active material improves. As used herein "spinel," "spinel phase," or "spinel-like phase" refers to compounds which are iso-structural with $MgAl_2O_4$ spinel.

A mole ratio of the metal oxide to the lithium fluoride may be in a range of about 1:1 to about 1:6, or, for example, about 1:1 to about 1:2, or about 1:1 to about 1:1.15.

The total amount of the metal oxide and the lithium fluoride may be in a range of about 0.01 part by weight to about 10 parts by weight, or about 0.5 part by weight to about 7.5 parts by weight, or, for example, about 1 part by weight to about 5 parts by weight, based on 100 parts by weight of the composite cathode active material. When the total amount of the metal oxide and the lithium fluoride is within this range, a lithium battery having improved capacity retention and improved high rate characteristics may be manufactured.

Figure 2:
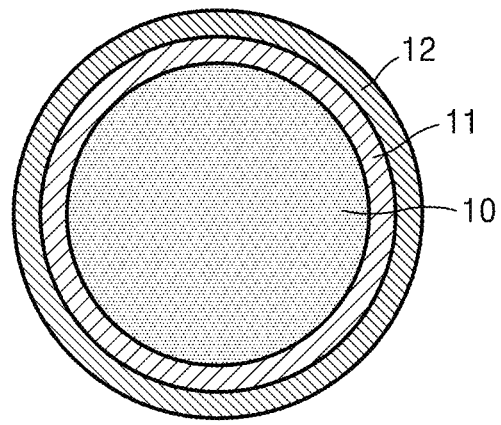
FIG. 2 is a schematic view of a structure of a composite cathode active material for a lithium battery, according to another exemplary embodiment.

As described above, and as shown in FIG. 2, the spinel-like phase 11 may be disposed between the lithium composite oxide 10 and the coating layer 12. When the spinel-like phase 11 is disposed between the lithium composite oxide 10 and the coating layer 12, a lithium battery having improved high rate characteristics, improved capacity characteristics, and increased lifespan characteristics, may be manufactured. The presence of the spinel-like phase may be confirmed using a transmission electron microscope (TEM).

The degree to which the spinel-like phase is formed may vary depending upon the amounts of the metal oxide and the lithium fluoride. For example, when the total amount of the metal oxide and the lithium fluoride is within the range of about 3 parts to about 10 parts by weight, based on 100 parts by weight of the composite cathode active material, the formation of the spinel-like phase may be increased as compared to when the total amount of the metal oxide and the lithium fluoride is less than about 3 parts by weight.

The metal oxide is at least one selected from aluminum oxide ($Al_2O_3$), bismuth oxide ($Bi_2O_3$), boron oxide ($B_2O_3$), zirconium oxide ($ZrO_2$), magnesium oxide (MgO), chrome oxide ($Cr_2O_3$), magnesium aluminate ($MgAl_2O_4$), a gallium oxide ($Ga_2O_3$), silicon oxide ($SiO_2$), tin oxide ($SnO_2$), calcium oxide (CaO), strontium oxide (SrO), barium oxide (BaO), yttrium oxide, titanium oxide ($TiO_2$), iron oxide ($Fe_2O_3$), molybdenum oxide ($MoO_3$ and $MoO_2$), cerium oxide ($CeO_2$), lanthanum oxide ($La_2O_3$), zinc oxide (ZnO), and lithium aluminum oxide ($LiAlO_2$). The metal oxide may be, for example, at least one selected from silica ($SiO_2$), alumina ($Al_2O_3$), zirconium oxide ($ZrO_2$), and titanium oxide ($TiO_2$).

Examples of the lithium composite oxide may include at least one selected from a layered oxide, an olivine oxide, and a spinel-phase oxide.

The lithium composite oxide includes at least one selected from compounds represented by Formulae 1 to 6.

$$Li_aNi_xCo_yMn_zM_cO_{2-e}A_e \qquad \text{Formula 1}$$

Wherein, in Formula 1, $1.0<a\le1.4$, $0<x<1$, $0\le y<1$, $0<z<1$, $0\le c<1$, $0<x+y+z+c<1$, and $0\le e<1$; M is at least one selected from vanadium (V), magnesium (Mg), gallium (Ga), silicon (Si), tungsten (W), molybdenum (Mo), iron (Fe), chrome (Cr), copper (Cu), zinc (Zn), titanium (Ti), aluminum (Al), and boron (B); and A is at least one anion element selected from F, S, Cl, and Br.

$$Li[Co_{1-x}M_x]O_{2-a}A_a \qquad \text{Formula 2}$$

Wherein, in Formula 2, $0\le a\le0.1$ and $0\le x\le0.1$; M is at least one metal selected from Mg, Al, Ni, Mn, Zn, Fe, Cr, Ga, Mo, and W; and A is at least one anion element selected from F, S, Cl, and Br.

$$Li_{1+a}[Ni_{1-x}M_x]O_{2-b}A_b \qquad \text{Formula 3}$$

Wherein, in Formula 3, $0.01\le a\le0.2$, $0\le b\le0.1$, and $0.01\le x\le0.5$; M is at least one metal selected from Mg, Al, Co, Mn, Zn, Fe, Cr, Ga, Mo, and W; and A is at least one anion element selected from F, S, Cl, and Br.

$$Li_{1+a}[Mn_{2-x}M_x]O_{4-b}A_b \qquad \text{Formula 4}$$

Wherein, in Formula 4, $0.01\le a\le0.15$, $0\le b\le0.1$, and $0\le x\le0.1$; A is at least one anion element selected from F, S, Cl, and Br; and M is at least one selected from Co, Ni, Cr, Mg, Al, Zn, Mo, and W.

$$LiM_xFe_{1-x}PO_4 \qquad \text{Formula 5}$$

Wherein, in Formula 5, M is at least one metal selected from Co, Ni, and Mn. and $0\le x\le1$.

$$Li_{1+a}[Ni_{0.5}Mn_{1.5-x}M_x]O_{4-b}A_b \qquad \text{Formula 6}$$

Wherein, in Formula 6, $0.01\le a\le0.15$, $0\le b\le0.1$, and $0\le x\le0.1$; A is at least one anion element selected from F, S, Cl, and Br; and M is at least one metal selected from Co, Ni, Cr, Mg, Al, Zn, Mo, and W.

In Formula 1, the sum of x, y, and z is 0.6 or higher, for example 0.8 or higher.

The lithium composite oxide may be at least one selected from compounds represented by Formula 7:

$$Li_aNi_xCo_yMn_zM_cO_{2-b}A_b \qquad \text{Formula 7}$$

Wherein, in Formula 7, $1.0<a\le1.4$, $0<x<1$, $0\le y<1$, $0<z<1$, $0\le c<1$, $0<x+y+z+c<1$, and $0\le b\le0.1$; M is at least one selected from vanadium (V), magnesium (Mg), gallium (Ga), silicon (Si), tungsten (W), molybdenum (Mo), iron (Fe), chrome (Cr), copper (Cu), zinc (Zn), titanium (Ti), aluminum (Al), and boron (B); and A is at least one anion element selected from F, S, Cl, and Br.

The lithium composite oxide may be at least one selected from
$Li_{1.4}Ni_{0.65}Co_{0.1}Mn_{0.25}O_{2+\delta}(\delta=0.4)$
  ($Li_{1.167}Ni_{0.542}Co_{0.083}Mn_{0.20}O_2$),
$Li_{1.3}Ni_{0.65}Co_{0.1}Mn_{0.25}O_{2+\delta}(\delta=0.3)$
  ($Li_{1.130}Ni_{0.565}Co_{0.088}Mn_{0.217}O_2$),
$Li_{1.4}Ni_{0.6}Co_{0.15}Mn_{0.25}O_{2+\delta}(\delta=0.4)$
  ($Li_{1.167}Ni_{0.5}Co_{0.125}Mn_{0.20}O_2$),
$Li_{1.3}Ni_{0.6}Co_{0.15}Mn_{0.25}O_{2+\delta}(\delta=0.3)$
  ($Li_{1.130}Ni_{0.522}Co_{0.130}Mn_{0.217}O_2$),
$Li_{1.4}Ni_{0.6}Co_{0.2}Mn_{0.2}O_{2+\delta}(\delta=0.4)$
  ($Li_{1.167}Ni_{0.5}Co_{0.1665}Mn_{0.1665}O_2$),
$Li_{1.3}Ni_{0.6}Co_{0.2}Mn_{0.2}O_{2+\delta}(\delta=0.3)$
  ($Li_{1.130}Ni_{0.522}Co_{0.174}Mn_{0.174}O_2$),
$Li_{1.4}Ni_{0.55}Co_{0.1}Mn_{0.35}O_{2+\delta}(\delta=0.4)$
  ($Li_{1.167}Ni_{0.458}Co_{0.083}Mn_{0.292}O_2$),
$Li_{1.3}Ni_{0.55}Co_{0.1}Mn_{0.35}O_{2+\delta}(\delta=0.3)$
  ($Li_{1.130}Ni_{0.478}Co_{0.087}Mn_{0.305}O_2$),
$Li_{1.4}Ni_{0.65}Co_{0.1}Mn_{0.25}O_{1.99+\delta}F_{0.01}(\delta=0.4)$
  ($Li_{1.167}Ni_{0.542}Co_{0.083}Mn_{0.208}O_{1.99}F_{0.01}$),
$Li_{1.3}Ni_{0.65}Co_{0.1}Mn_{0.25}O_{1.99+\delta}F_{0.01}(0.01+\delta)$
  ($Li_{1.130}Ni_{0.565}Co_{0.088}Mn_{0.217}O_{1.99}F_{0.01}$),
$Li_{1.4}Ni_{0.6}Co_{0.15}Mn_{0.25}O_{1.99+\delta}F_{0.01}(0.01+\delta)$
  ($Li_{1.167}Ni_{0.5}Co_{0.125}Mn_{0.208}O_{1.99}F_{0.01}$), $Li_{1.3}Ni_{0.6}Co_{0.15}Mn_{0.25}O_{1.99+\delta}F_{0.01}$ (0.01+$\delta$)
($Li_{1.130}Ni_{0.522}Co_{0.130}Mn_{0.218}O_{1.99}F_{0.01}$),
$Li_{1.4}Ni_{0.6}Co_{0.2}Mn_{0.2}O_{1.99+\delta}F_{0.01}$ (0.01+$\delta$)
($Li_{1.167}Ni_{0.5}Co_{0.1665}Mn_{0.1665}O_{1.99}F_{0.01}$),
$Li_{1.3}Ni_{0.6}Co_{0.2}Mn_{0.2}O_{1.99+\delta}F_{0.01}$ ($\delta$=0.3)
($Li_{1.130}Ni_{0.522}Co_{0.174}Mn_{0.174}O_{1.99}F_{0.01}$),
$Li_{1.4}Ni_{0.55}Co_{0.1}Mn_{0.35}O_{1.99+\delta}F_{0.01}$ ($\delta$=0.4)
($Li_{1.167}Ni_{0.458}Co_{0.083}Mn_{0.292}O_{1.99}F_{0.01}$) and
$Li_{1.3}Ni_{0.55}Co_{0.1}Mn_{0.35}O_{1.99+\delta}F_{0.01}$ ($\delta$=0.3)
($Li_{1.130}Ni_{0.478}Co_{0.087}Mn_{0.305}O_{1.99}F_{0.01}$).

The coating layer may be in the form of a continuous layer. The continuity of the layered form may be confirmed using a scanning electron microscope. When the coating layer is in the form of a continuous layer, direct reaction between the lithium composite oxide and an electrolyte may be effectively suppressed.

In an embodiment, the coating layer covers 100%, or about 50% to about 99%, or about 60% to about 98%, or about 70% to about 95% of an entirety of a surface of the lithium composite oxide 10.

The total thickness of the coating layer may be in a range of about 1 nanometer (nm) to about 1 micrometer (μm), or about 5 nm to about 500 nm, or, for example, about 10 nm to about 100 nm. When the total thickness of the coating layer is within the above ranges, a lithium battery having excellent capacity retention rates and high rate characteristics may be manufactured.

The coating layer may include, for example, a composite including the metal oxide and a lithium fluoride (LiF), or a mixture of a metal oxide and a lithium fluoride. For example, the metal oxide may be an aluminum oxide ($Al_2O_3$).

When the coating layer has a two-layered structure that contains a first coating layer including a metal oxide and a second coating layer including a lithium fluoride, or a two-layered structure that contains a first coating layer including a lithium fluoride and a second coating layer including a metal oxide, the total thickness of the coating layer increases, and thus the electrochemical performance of the composite cathode active material degrades. Therefore, in the composite cathode active material according to an embodiment, the coating layer may have a single-layered structure.

The composite cathode active material according to an embodiment may have a structure in which a coating layer containing lithium fluoride and a coating layer containing aluminum oxide are stacked on a surface of an overlithiated layered oxide (OLO). Here, examples of the OLO may include at least one selected from
$Li_{1.167}Ni_{0.542}Co_{0.083}Mn_{0.20}O_2$,
$Li_{1.130}Ni_{0.565}Co_{0.088}Mn_{0.217}O_2$,
$Li_{1.167}Ni_{0.5}Co_{0.125}Mn_{0.208}O_2$,
$Li_{1.130}Ni_{0.522}Co_{0.130}Mn_{0.217}O_2$,
$Li_{1.167}Ni_{0.5}Co_{0.1665}Mn_{0.1665}O_2$,
$Li_{1.130}Ni_{0.522}Co_{0.174}Mn_{0.174}O_2$,
$Li_{1.167}Ni_{0.458}Co_{0.083}Mn_{0.292}O_2$,
$Li_{1.130}Ni_{0.478}Co_{0.087}Mn_{0.305}O_2$,
$Li_{1.167}Ni_{0.542}Co_{0.083}Mn_{0.208}O_{1.99}F_{0.01}$, $Li_{1.130}Ni_{0.565}Co_{0.088}Mn_{0.217}O_{1.99}F_{0.01}$, and $Li_{1.167}Ni_{0.5}Co_{0.125}Mn_{0.20}O_{1.99}F_{0.01}$.

An average particle diameter of the composite cathode active material may be in a range of about 10 nm to about 500 μm, or, for example, about 20 nm to about 100 μm, or about 1 μm to about 30 μm. When the average particle diameter of the composite cathode active material is within the above ranges, a lithium battery including the composite cathode active material may have improved physical properties.

The composite cathode active material according to an embodiment may not exhibit a peak between about 23 degrees two-theta (° 2θ) to about 27° 2θ, as measured by X-ray powder diffraction (XRD). In this regard, the coating layer does not include $AlF_3$. In an embodiment, the composite cathode active material does not have a peak between about 23 degrees two-theta (° 2θ) to about 27° 2θ, when analyzed by X-ray powder diffraction (XRD).

The composite cathode active material exhibits a peak between about 72 electron volts (eV) to about 75 eV and a peak between about 683 eV to about 688 eV, as measured by X-ray photoelectron spectroscopy (XPS). An F1s peak is observed between about 683 eV to about 688 eV, and an Al2p peak is observed between about 72 eV to about 75 eV.

A tap density of the composite cathode active material is in range of about 0.5 grams per cubic centimeter (g/cm³) to about 3 g/cm³. When the tap density of the composite cathode active material is within this range, a lithium battery including the composite cathode active material may have improved voltage and lifespan characteristics.

The coating layer formed on the surface of the composite cathode active material may further include a conductive material. The conductive material may be at least one selected from a carbonaceous material, a conductive polymer, ITO, $RuO_2$, and ZnO.

The carbonaceous material may be at least one selected from crystalline carbon and amorphous carbon. The crystalline carbon may be graphite, such as natural graphite or artificial graphite in non-shaped, plate, flake, spherical, and/or fibrous form. The amorphous carbon may be at least one selected from soft carbon (low temperature fired carbon), hard carbon, meso-phase pitch carbonization products, sintered cokes, graphene, carbon black, fullerene soot, carbon nanotubes, and carbon fibers, but is not limited thereto, and any suitable amorphous carbon material may be used.

Examples of the carbonaceous material may include at least one selected from carbon nanotubes, fullerene, graphene, and carbon fibers. Also, examples of the conductive polymer may include at least one selected from polyaniline, polythiophene, and polypyrrole.

Hereinafter, a method of preparing a composite cathode active material, according to another exemplary embodiment, will be further described.

The method of preparing a composite cathode active material may be a wet method, for example, a co-precipitation method.

First, a metal oxide precursor, a lithium composite oxide, a fluoride precursor, and a solvent are mixed to prepare a mixture, and then the mixture is allowed to react to form a reaction product.

The reaction product obtained from the reaction is dried. The reaction product is dried without first undergoing a washing process. When the resultant undergoes the washing process, for example using water, a lithium-containing compound such as lithium fluoride is removed from the reaction product, and thus can become difficult to manufacture a coating layer including lithium fluoride as desired. Thus, a washing process is not performed before the drying of the reacted product.

The drying process is performed at a temperature, for example, in a range of about 50° C. to about 100° C., or in a range of about 55° C. to about 90° C., or, for example, in a range of about 60° C. to about 85° C.

The dried reaction product then undergoes a heat-treating process. Here, the heat-treating process is performed at a temperature, for example, in a range of about 400° C. to about 700° C., or in a range of about 450° C. to about 700°

C., or, for example, in a range of about 400° C. to about 550° C., or, for example, higher than 400° C. to about 500° C. The heat-treating process may be performed in an inert gas atmosphere such as in the presence of at least one gas selected from nitrogen, argon, and helium. Alternatively, the heat-treating process may be performed in an oxidative gas atmosphere such in the presence of oxygen or air. When the temperature of the heat-treating process is within the above-described ranges, and the heat-treating process is performed in either an inert gas or oxidative gas atmosphere, the composite cathode active material may have excellent capacity, lifespan, and rate capability.

The metal oxide precursor may be at least one selected from an alkoxide, a sulfate, a nitrate, an acetate, a chloride, and a phosphate of at least one selected from aluminum, bismuth, zirconium, magnesium, chrome, gallium, silicon, tin, calcium, strontium, barium, yttrium, titanium, iron, molybdenum, cerium, lanthanum, and zinc. In some embodiments, the metal oxide precursor may be at least one selected from aluminum nitrate, aluminum acetate, aluminum chloride, aluminum sulfate, and aluminum phosphate.

The fluoride precursor may be at least one selected from ammonium fluoride, ammonium hydrogen fluoride, cesium fluoride, potassium fluoride, and sodium fluoride.

A mole ratio of the metal oxide precursor to the fluoride precursor is in a range of about 1:1 to about 1:6, or about 1:1 to about 1:4, or, for example, about 1:1 to about 1:2. When the mole ratio of the metal oxide precursor to the fluoride precursor is within these ranges, the composite cathode active material may have excellent cycle characteristics and high rate characteristics.

Examples of the solvent used in the mixture may include ethanol and water.

The mixing of the metal oxide precursor, lithium composite oxide, fluoride precursor, and solvent may include, for example, first mixing the metal oxide precursor, the fluoride precursor, and the solvent, and then adding the lithium composite oxide thereto. Alternatively, the mixing of the metal oxide precursor, lithium composite oxide, fluoride precursor, and solvent may include first mixing the metal oxide precursor, the solvent, and the lithium composite oxide, and then adding the fluoride precursor thereto.

According to another aspect of an exemplary embodiment, a cathode includes the composite cathode active material.

According to another aspect of an exemplary embodiment, a lithium battery includes the cathode.

The cathode is prepared as follows.

A cathode active material composition is prepared by mixing a cathode active material, a binder, and a solvent.

A conducting agent may be further added to the cathode active material composition.

The cathode active material composition may be directly coated on a current collector and then dried to prepare a cathode. Alternatively, the cathode active material composition may be cast on a separate support to prepare a film, and then the film is detached from the support and laminated on a current collector to prepare a cathode.

The cathode active material may be the composite cathode active material according to an embodiment. The cathode active material may further include a first cathode active material in addition to the composite cathode active material. The first cathode active material may be any cathode active material which is suitable for use in a lithium battery.

Examples of the first cathode active material may include at least one selected from a lithium cobalt oxide, a lithium nickel cobalt manganese oxide, a lithium nickel cobalt aluminum oxide, a lithium iron phosphate, and a lithium manganese oxide, but is not limited thereto, and may be any cathode active material suitable for use as the first cathode active material.

For example, the first cathode active material may be a compound that is represented by at least one selected from the following formulae: $Li_aA_{1-b}B_bD_2$ (where, $0.90 \leq a \leq 1.8$ and $0 \leq b \leq 0.5$); $Li_aE_{1-b}B_bO_{2-c}D_c$ (where, $0.90 \leq a \leq 1.8$, $0 \leq b \leq 0.5$, and $0 \leq c \leq 0.05$); $LiE_{2-b}B_bO_{4-c}D_c$ (where, $0 \leq b \leq 0.5$ and $0 \leq c \leq 0.05$); $Li_aNi_{1-b-c}Co_bB_cD_\alpha$ (where, $0.90 \leq a \leq 1.8$, $0 \leq b \leq 0.05$, $0 \leq c \leq 0.05$, and $0 < \alpha \leq 2$); $Li_aNi_{1-b-c}Co_bB_cO_{2-\alpha}F_\alpha$ (where, $0.90 \leq a \leq 1.8$, $0 \leq c \leq 0.05$, and $0 < \alpha < 2$); $Li_aNi_{1-b-c}Mn_bB_cD_\alpha$ (where, $0.90 \leq a \leq 1.8$, $0 \leq b \leq 0.05$, $0 \leq c \leq 0.05$, and $0 < \alpha \leq 2$); $Li_aNi_{1-b-c}Mn_bB_cO_{2-\alpha}F_\alpha$ (where, $0.90 \leq a \leq 1.8$, $0 \leq b \leq 0.5$, $0 \leq c \leq 0.05$, and $0 < \alpha < 2$); $Li_aNi_bE_cG_dO_2$ (where, $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where, $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where, $0.90 \leq a \leq 1.8$ and $0.001 \leq b \leq 0.1$); $Li_aCoG_bO_2$ (where, $0.90 \leq a \leq 1.8$ and $0.001 \leq b \leq 0.1$); $Li_aMnG_bO_2$ (where, $0.90 \leq a \leq 1.8$ and $0.001 \leq b \leq 0.1$); $Li_aMn_2G_bO_4$ (where, $0.90 \leq a \leq 1.8$ and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (where, $0 \leq f \leq 2$); $Li_{(3-f)}Fe_2(PO_4)_3$ (where, $0 \leq f \leq 2$); and $LiFePO_4$.

In the above formulae, A is at least one selected from Ni, Co, and Mn; B is at least one selected from Al, Ni, Co, Mn, Cr, Fe, Mg, Sr, V, and a rare-earth element; D is at least one selected from O, F, S, and P; E is at least one selected from Co and Mn; F is at least one selected from F, S, and P; G is at least one selected from Al, Cr, Mn, Fe, Mg, La, Ce, Sr, and V; Q is at least one selected from Ti, Mo, and Mn; I is at least one selected from Cr, V, Fe, Sc, and Y, and J is at least one selected from V, Cr, Mn, Co, Ni, and Cu.

The first cathode active material may be, for example, at least one selected from a compound represented by Formula 8, a compound represented by Formula 9, and a compound represented by Formula 10.

$$Li_aNi_bCo_cMn_dO_2 \qquad \text{Formula 8}$$

Wherein, in Formula 8, $0.90 \leq a \leq 1.8$, $0 \leq b \leq 0.9$, $0 \leq c \leq 0.5$, and $0 \leq d \leq 0.9$.

$$Li_2MnO_3 \qquad \text{Formula 9}$$

$$LiMO_2 \qquad \text{Formula 10}$$

Wherein, in Formula 10, M is Mn, Fe, Co, or Ni.

Examples of the conducting agent may include at least one selected from carbon black, natural graphite, artificial graphite, acetylene black, Ketjen black; carbon fibers; carbon nanotubes; a metal powder, metal fibers; metal tubes of copper, nickel, aluminum, and/or silver; and a conductive polymer such as a polyphenylene derivative, but is not limited thereto, and any material suitable for use as a conducting agent may be used.

Examples of the binder may include at least one selected from a vinylidene fluoride/hexafluoropropylene copolymer, polyvinylidenefluoride, polyimide, polyethylene, polyester, polyacrylonitrile, polymethyl methacrylate, polytetrafluoroethylene (PTFE), a carboxymethyl cellulose-styrene-butadiene rubber (CMC/SBR), and a styrene butadiene rubber-based polymer.

Examples of the solvent may include at least one selected from N-methylpyrrolidone, acetone, and water, but is not limited thereto, and any material suitable for use as a solvent may be used.

Amounts of the composite cathode active material, the conducting agent, the binder, and the solvent are not limited and may be readily determined by the person of skill in the art without undue experiments. At least one of the conducting agent, the binder, and the solvent may be omitted depending on a use or a structure of the lithium battery.

An anode may be prepared using a similar method as described for the cathode, except that an anode active material is used instead of the cathode active material.

The anode active material may be at least one selected from a carbonaceous material, silicon, a silicon oxide, a silicon-based alloy, a silicon-carbonaceous material composite, tin, a tin-based alloy, a tin-carbon composite, and a metal oxide.

The carbonaceous material may be at least one of a crystalline carbon and an amorphous carbon. The crystalline carbon may be graphite, such as natural graphite or artificial graphite that is in non-shaped, plate, flake, spherical or fibrous form. The amorphous carbon may be at least one selected from soft carbon (carbon sintered at low temperatures), hard carbon, meso-phase pitch carbonization products, sintered cokes, graphene, carbon black, fullerene soot, carbon nanotubes, and carbon fibers, but is not limited thereto, and any suitable amorphous carbon material may be used.

The anode active material may be at least one selected from Si, SiOx (where, $0<x<2$, or, for example, $0.5<x<1.5$), Sn, $SnO_2$, and a silicon-containing metal alloy. A metal in the silicon-containing metal alloy may be at least one selected from Al, Sn, Ag, Fe, Bi, Mg, Zn, In, Ge, Pb, and Ti.

The anode active material may include at least one selected from a metal/semi-metal alloyable with lithium, an alloy thereof, and an oxide thereof. For example, the metal/semi-metal alloyable with lithium, the alloy thereof, and the oxide thereof may be at least one selected from Si, Sn, Al, Ge, Pb, Bi, Sb, an Si—Y' alloy (where, Y' is at least one selected from an alkaline metal, an alkaline earth metal, a Group 13 to 16 element, a a transition metal, and a rare earth element, and is not Si), a Sn—Y' alloy (where, Y' is at least one selected from an alkaline metal, an alkaline earth metal, a Group 13 element, Group 14 element, a transition metal, and a rare earth element, and is not Sn), or $MnO_x$ (where, $0<x\leq2$). Examples of the element Y' may include at least one selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, and Po. Examples of the oxide of the metal/semi-metal alloyable with lithium may include at least one selected from a lithium titanium oxide, a vanadium oxide, a lithium vanadium oxide, $SnO_2$, and $SiO_x$ ($0<x<2$).

For example, the anode active material may include at least one element selected from a Group 13 element, a Group 14 element, and a Groups 15 element.

For example, the anode active material may include at least one element selected from Si, Ge, and Sn.

Amounts of the anode active material, conducting agent, binder, and solvent are not limited and may be determined by one of ordinary skill in the art without undue experimentation.

A separator is disposed between the cathode and the anode, and the separator may be an insulating thin film having high ion permeability and mechanical strength.

A pore diameter of a separator is generally in a range of about 0.01 μm to about 10 μm, and a thickness thereof is generally in a range of about 5 μm to about 20 μm. The separator may be, for example, an olefin-based polymer such as polypropylene or a sheet or a non-woven fabric formed of glass fibers or polyethylene. When a solid polymer electrolyte is used as an electrolyte, the solid polymer electrolyte may also serve as a separator.

Examples of the olefin-based polymer may include at least one selected from polyethylene, polypropylene, and polyvinylidene fluoride. The separator may be a single layer or a multi-layer including at least two layers of the olefin-based polymer, where each layer may be the same olefin-based polymer or different olefin-based polymers. In some embodiments, the separator may be a mixed multi-layer including different olefin-based polymers, such as a polyethylene/polypropylene 2-layered separator, a polyethylene/polypropylene/polyethylene 3-layered separator, or a polypropylene/polyethylene/polypropylene 3-layered separator.

The lithium salt-containing non-aqueous electrolyte includes a non-aqueous electrolyte and a lithium salt.

Examples of the non-aqueous electrolyte may include at least one selected from a non-aqueous electrolyte solution, an organic solid electrolyte, and an inorganic solid electrolyte.

The non-aqueous electrolyte solution includes an organic solvent. The organic solvent may be any suitable material available as an organic solvent. Examples of the non-aqueous electrolyte solution may include at least one selected from propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethyl formamide, N, N-dimethyl acetamide, dimethylsulfoxide, dioxane, 1,2-dimethoxyethane, sulfolane, dichloroethane, chlorobenzene, nitrobenzene, diethylene glycol, and dimethyl ether.

Examples of the organic solid electrolyte may include at least one selected from a polyethylene derivative, a polyethylene oxide derivative, a polypropylene oxide derivative, a phosphate ester polymer, poly-L-lysine, polyester sulfide, polyvinyl alcohol, polyvinylidene fluoride, and polymers containing ionic dissociation groups.

Examples of the inorganic solid electrolyte may include at least one selected from $Li_3N$, LiI, $Li_5NI_2$, $Li_3N$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the non-aqueous electrolyte. Examples of the lithium salt may include at least one selected from $LiPF_6$, $LiBF_4$, $LiSbF_6$, $LiAsF_6$, $LiClO_4$, $LiCF_3SO_3$, $LiN(CF_3SO_2)_2$, $LiN(FSO_2)_2$, $LiC_4F_9SO_3$, $LiAlO_2$, $LiAlCl_4$, $LiN(C_xF_{2x+1}SO_2)(C_yF_{2y+1}SO_2)$ (where, x and y are a natural number), LiCl, and LiI. Also, in order to increase charging/discharging characteristics or flame resistance of the electrolyte, for example, the non-aqueous electrolyte may further include at least one selected from pyridine, triethylphosphite, triethanolamine, cyclic ether, ethylenediamine, n-glyme, hexamethyl phosphoramide, nitrobenzene derivatives, sulfur, quinone imine dyes, N-substituted oxazolidinone, N,N-substituted imidazolidine, ethyleneglycol dialkylether, ammonium salts, pyrrole, 2-methoxyethanol, and aluminum trichloride. In some embodiments, in order to impart incombustibility, the electrolyte may further include a halogen-containing solvent such as carbon tetrachloride and/or ethylene trifluoride.

Figure 3:
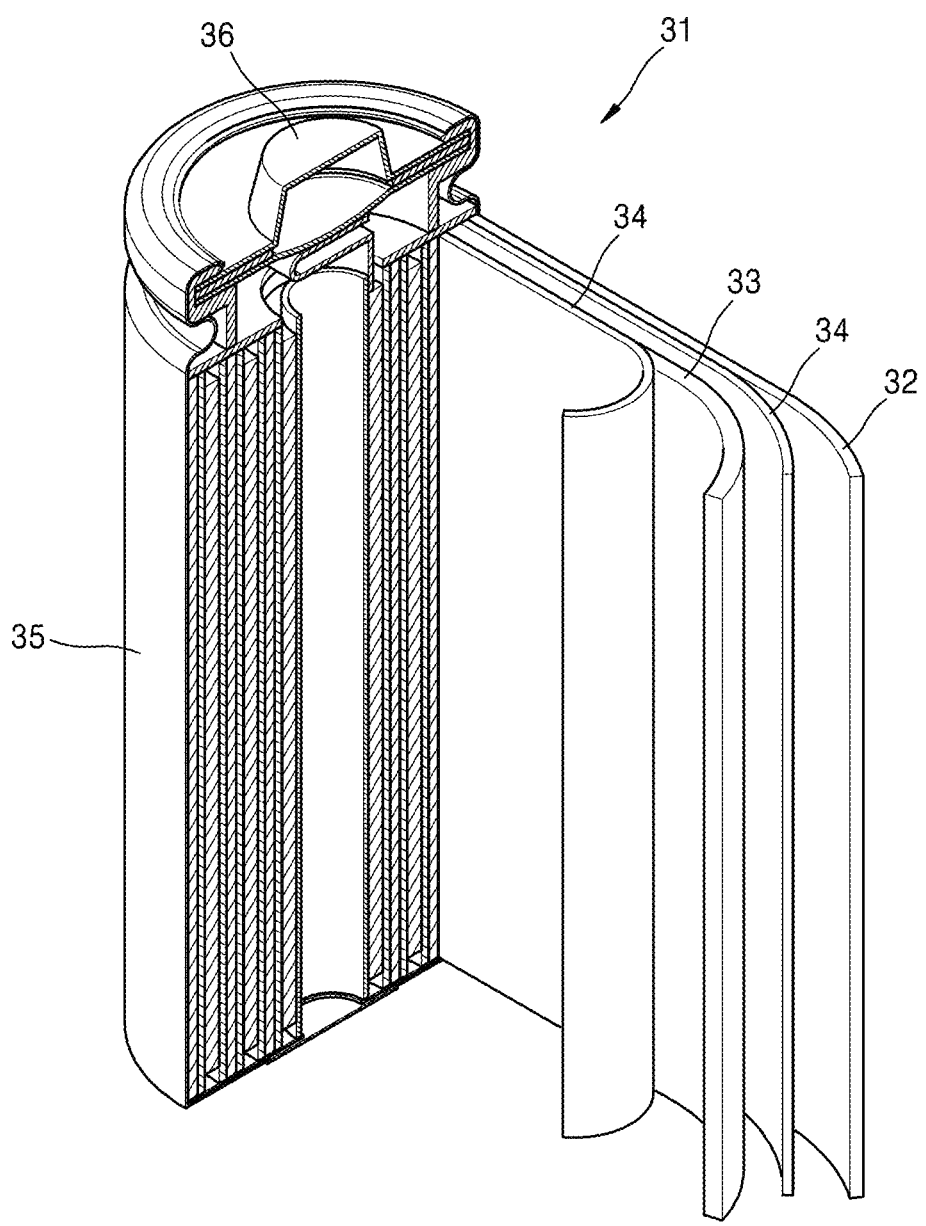
FIG. 3 is an exploded perspective view of a lithium battery, according to an exemplary embodiment.

As shown in FIG. 3, a lithium battery 31 includes a cathode 33, an anode 32, and a separator 34. The cathode 33, the anode 32, and the separator 34 are wound and folded to be accommodated in a battery case 35. Then, an organic electrolyte solution is injected into the battery case 35, and the battery case 35 is sealed with a cap assembly 36, thereby completing manufacture of the lithium battery 31. The battery case 35 may be in a shape of a cylinder, a box, or a film. The lithium battery 31 may be a lithium ion battery.

A battery assembly may be prepared by disposing a separator between a cathode and an anode. A plurality of the battery assemblies may be stacked in a bi-cell structure and impregnated with the electrolyte solution. The resultant is put into a pouch and sealed, thereby completing the manufacture of a lithium ion polymer battery.

Also, a plurality of the battery assemblies may be stacked to form a battery pack, which may be used in any device that requires high capacity and high output, for example, in a laptop computer, a smart phone, or an electric vehicle (EV).

Charging/discharging tests were performed on a half-cell including a cathode including the composite cathode active material according to an embodiment and a lithium metal as a counter electrode. When the results of the test are shown as a charging/discharging capacity differentiated by the voltage (dQ/dV, a vertical axis) versus a voltage (V, a horizontal axis) with respect to a lithium metal, the composite cathode active material has a redox peak in a spinel structure within a range of about 2.0 V to about 3.0 V during charging/discharging of the battery.

Since the lithium battery according to an embodiment has excellent high rate characteristics and lifespan characteristics, the lithium battery is suitable for an electric vehicle (EV). For example, the lithium battery is suitable for a hybrid vehicle such as a plug-in hybrid electric vehicle (PHEV).

Hereinafter, the present disclosure is described in more detail according to examples below. However, the scope of the present disclosure is not limited thereto.

EXAMPLES

Comparative Example 1: Preparation of Cathode Active Material

Nickel sulfate, cobalt sulfate, and manganese sulfate, as starting materials, were stoichiometrically mixed to prepare a composite cathode active material ($Li_{1.4}Ni_{0.65}Co_{0.1}Mn_{0.25}O_{1.99}F_{0.01}$).

Nickel sulfate, cobalt sulfate, and manganese sulfate were dissolved in distilled water so that an aqueous solution has a concentration of 2 molar (M) to prepare a precursor mixture. $NH_4OH$, as a chelating agent, and NaOH as a precipitating agent, were added to the precursor mixture at a temperature of 60° C. for 4 hours to facilitate co-precipitation, and thus a precipitate of $(Ni,Co,Mn)(OH)_2$ was obtained.

The precipitate ($(Ni,Co,Mn)(OH)_2$) was washed with distilled water and dried at a temperature of 80° C. for 24 hours and mixed with lithium carbonate. Here, the lithium carbonate was stoichiometrically mixed with the precipitate ($(Ni,Co,Mn)(OH)_2$) to prepare the composite cathode active material ($Li_{1.4}Ni_{0.65}Co_{0.1}Mn_{0.25}O_{1.99}F_{0.01}$).

The mixture was heat-treated at a temperature of 900° C. for 10 hours in atmospheric air, and thus a composite cathode active material of the formula $Li_{1.4}Ni_{0.65}Co_{0.1}Mn_{0.25}O_{1.99+\delta}F_{0.01}$ ($\delta$=0.4) (equivalent to $Li_{1.167}Ni_{0.542}Co_{0.083}Mn_{0.208}O_{1.99}F_{0.01}$) was prepared.

Comparative Example 2: Preparation of Composite Cathode Active Material

A cathode active material having a lithium fluoride (LiF) coating layer formed on a surface of the composite cathode active material ($Li_{1.167}Ni_{0.542}Co_{0.083}Mn_{0.208}O_{1.99}F_{0.01}$) prepared in Comparative Example 1 was obtained as follows.

0.26 grams (g) of lithium nitrate and 50 milliliters (mL) of water were added to and mixed with 20 g of the cathode active material prepared in Comparative Example 1, an ammonium fluoride was added to the mixture, and the mixture was stirred at a temperature of 80° C. to perform precipitation. The precipitate was dried at a temperature of about 120° C. for 12 hours, and the dried resultant was heat-treated at a temperature of about 400° C. for 5 hours to obtain the composite cathode active material having a coating layer including a lithium fluoride.

Example 1: Preparation of Composite Cathode Active Material 50 mL of ethanol and 0.26 g of ammonium fluoride ($NH_4F$) were added to 0.89 g of aluminum nitrate hydrate ($Al(NO_3)_3 \cdot 9H_2O$), and the mixture was stirred at a temperature of about 80° C. for 10 minutes to prepare a reaction mixture. A mole ratio of aluminum nitrate hydrate ($Al(NO_3)_3 \cdot 9H_2O$) to ammonium fluoride ($NH_4F$) was about 1:3.

20 g of the cathode active material prepared in Comparative Example 1 was added to the reaction mixture, and the reaction mixture was stirred at a temperature of about 80° C. to perform precipitation. A precipitate obtained by the precipitation was dried at a temperature of about 120° C. for 12 hours, and the dried resultant was heat-treated at a temperature of about 400° C. for 5 hours, in a nitrogen atmosphere, to obtain a composite cathode active material having a coating layer including aluminum oxide ($Al_2O_3$) and lithium fluoride. The total amount of aluminum oxide and lithium fluoride was about 1 part by weight based on 100 parts by weight of the total weight of the composite cathode active material.

Example 2: Preparation of Composite Cathode Active Material

A composite cathode active material having a coating layer including aluminum oxide and lithium fluoride was prepared in the same manner as in Example 1, except that amounts of aluminum nitrate hydrate ($Al(NO_3)_3 \cdot 9H_2O$) and ammonium fluoride ($NH_4F$) were changed to 2.68 g and 0.79 g, respectively. The total amount of aluminum oxide and lithium fluoride was about 3 parts by weight based on 100 parts by weight of the total weight of the composite cathode active material.

Example 3: Preparation of Composite Cathode Active Material

A composite cathode active material having a coating layer including aluminum oxide and lithium fluoride was prepared in the same manner as in Example 1, except that amounts of aluminum nitrate hydrate ($Al(NO_3)_3 \cdot 9H_2O$) and ammonium fluoride ($NH_4F$) were changed to 4.46 g and 1.32 g, respectively. The total amount of aluminum oxide and lithium fluoride was about 5 parts by weight based on 100 parts by weight of the total weight of the composite cathode active material.

Examples 4 to 6: Preparation of Composite Cathode Active Materials

Composite cathode active materials having a coating layer including aluminum oxide and lithium fluoride were prepared in the same manner as in Examples 1 to 3, except that the heat-treatment was performed in an air atmosphere instead of the nitrogen atmosphere.

Example 7: Preparation of Composite Cathode Active Material

A composite cathode active material having a coating layer including aluminum oxide and lithium fluoride was prepared in the same manner as in Example 1, except that amounts of aluminum nitrate hydrate ($Al(NO_3)_3.9H_2O$) and ammonium fluoride ($NH_4F$) were changed to 0.89 g and 0.52 g, respectively. Here, the total amount of aluminum oxide and lithium fluoride was about 1.22 parts by weight based on 100 parts by weight of the total weight of the composite cathode active material. A mole ratio of aluminum nitrate hydrate ($Al(NO_3)_3.9H_2O$) to ammonium fluoride ($NH_4F$) was about 1:6.

Example 8: Preparation of Composite Cathode Active Material

A composite cathode active material having a coating layer including aluminum oxide and lithium fluoride was prepared in the same manner as in Example 1, except that amounts of aluminum nitrate hydrate ($Al(NO_3)_3.9H_2O$) and ammonium fluoride ($NH_4F$) were changed to 0.89 g and 0.13 g, respectively, and a mole ratio of aluminum nitrate hydrate ($Al(NO_3)_3.9H_2O$) to ammonium fluoride ($NH_4F$) was about 1:1.5. Here, the total amount of aluminum oxide and lithium fluoride was about 0.89 parts by weight based on 100 parts by weight of the total weight of the composite cathode active material, and a mole ratio of aluminum nitrate hydrate to ammonium fluoride was about 1:1.5.

Example 9: Preparation of Composite Cathode Active Material

A composite cathode active material having a coating layer including yttrium oxide ($Y_2O_3$) and lithium fluoride (LiF) on a OLO core was prepared in the same manner as in Example 1, except that 0.52 g of yttrium nitrate was used instead of 0.89 g of aluminum nitrate hydrate (Al($NO_3)_3.9H_2O$) and that a mole ratio of yttrium nitrate to lithium fluoride was 1:3. In the coating layer, a mole ratio of yttrium oxide to lithium fluoride was 1:3, and an amount of yttrium oxide and lithium fluoride was about 1.47 parts by weight based on 100 parts by weight of the total weight of the composite cathode active material.

Example 10: Preparation of Composite Cathode Active Material

A composite cathode active material having a coating layer including strontium oxide and lithium fluoride (LiF) on an OLO core was prepared in the same manner as in Example 1, except that 0.34 g of strontium nitrate was used instead of 0.89 g of aluminum nitrate hydrate ($Al(NO_3)_3.9H_2O$) and a mole ratio of strontium nitrate to lithium fluoride was 1:2. A mole ratio of strontium oxide to lithium fluoride in the coating layer was 1:2, and the total amount of strontium oxide and lithium fluoride was about 0.52 parts by weight based on 100 parts by weight of the total weight of the composite cathode active material.

Comparative Example 3: Preparation of Coin-Half Cell

The composite cathode active material powder prepared in Comparative Example 1, was mixed with acetylene black, and polyvinylidene fluoride (PVDF) in a weight ratio of 90:5:5 in N-methylpyrrolidone (NMP) to prepare a slurry. The prepared slurry was coated on an aluminum foil having a thickness of 15 μmusing a doctor blade, vacuum-dried at a temperature of 120° C., and pressed using a roll-press to prepare a cathode in the form of a sheet.

A separator formed of porous polyethylene was disposed between the cathode and the anode formed of a lithium metal, and an electrolyte solution was injected thereto to prepare a coin-half cell. Here, the electrolyte was prepared by dissolving 1.3 M $LiPF_6$ in a solvent including fluoroethylene carbonate (FEC), dimethylcarbonate (DMC) and a thermal stabilizer, at a volume ratio of 15:45:40.

Comparative Example 4: Preparation of Coin-Half Cell

A coin-half cell was prepared in the same manner as in Comparative Example 3, except that the cathode active material prepared in Comparative Example 2 was used instead of the cathode active material prepared in Comparative Example 1.

Comparative Example 5: Preparation of Composite Cathode Active Material

A composite cathode active material was prepared by dry-milling 0.2 g of aluminum oxide and 0.6 g of lithium fluoride with 20 g of the cathode active material prepared in Comparative Example 1, in a miller.

Comparative Example 6: Preparation of Coin-Half Cell

A coin-half cell was prepared in the same manner as in Comparative Example 3, except that the cathode active material prepared in Comparative Example 5 was used instead of the cathode active material prepared in Comparative Example 1.

Comparative Example 7: Preparation of Cathode Active Material 0.89 g of aluminum nitrate was mixed with 50 mL of ethanol to obtain an aluminum nitrate solution. The aluminum nitrate solution was added to 20 g of the cathode active material prepared in Comparative Example 1, the mixture was homogeneously mixed, and ammonium hydroxide was added dropwise thereto to prepare a composite cathode active material having an aluminum oxide coating layer formed on a surface of the cathode active material prepared in Comparative Example 1. An amount of aluminum oxide was about 1 part by weight based on 100 parts by weight of the composite cathode active material.

Comparative Example 8: Preparation of Coin-Half Cell

A coin-half cell was prepared in the same manner as in Comparative Example 3, except that the cathode active material prepared in Comparative Example 7 was used instead of the cathode active material prepared in Comparative Example 1.

Comparative Example 9: Preparation of Cathode Active Material 0.26 g of ammonium fluoride and 50 mL of ethanol were added to 20 g of the cathode active material prepared in Comparative Example 1, and the mixture was stirred at a temperature of 80° C. to perform precipitation. The precipitate obtained by the precipitation was dried at a temperature of about 120° C. for 12 hours, and the dried resultant was heat-treated at a temperature of about 400° C. for 5 hours to obtain a composite cathode active material having a first coating layer including lithium fluoride.

0.89 g of aluminum nitrate and 50 ml of ethanol were added to 20 g of the cathode active material, and the mixture was stirred at a temperature of 80° C. to perform precipitation. The precipitate obtained by the precipitation was dried at a temperature of about 120° C. for 12 hours, and the dried resultant was heat-treated at a temperature of about 400° C. for 5 hours in a nitrogen atmosphere to obtain a composite cathode active material. The composite cathode active material includes the cathode active material prepared in Comparative Example 1, a first coating layer including lithium fluoride, and a second coating layer including aluminum oxide formed on the cathode active material prepared in Comparative Example 1. An amount of lithium fluoride in the first coating layer was about 0.5 part by weight based on 100 parts by weight of the total weight of the composite cathode active material, and an amount of aluminum oxide in the second coating layer was about 0.5 part by weight based on 100 parts by weight of the total weight of the composite cathode active material.

Comparative Example 10: Preparation of Coin-Half Cell

A coin-half cell was prepared in the same manner as in Comparative Example 3, except that the cathode active material prepared in Comparative Example 9 was used instead of the cathode active material prepared in Comparative Example 1.

Comparative Example 11: Preparation of Cathode Active Material 50 ml of ethanol and 0.26 g of ammonium fluoride (NH$_4$F) were added to 0.89 g of aluminum nitrate hydrate (Al(NO$_3$)$_3$·9H$_2$O), and the mixture was stirred at a temperature of 70° C. for 10 minutes. A mole ratio of aluminum nitrate hydrate (Al(NO$_3$)$_3$·9H$_2$O) to ammonium fluoride (NH$_4$F) was 1:3.

20 g of the cathode active material prepared in Comparative Example 1, Li$_{1.4}$Ni$_{0.65}$Co$_{0.1}$Mn$_{0.25}$O$_{1.99+\delta}$F$_{0.01}$ ($\delta$=0.4) (equivalent to Li$_{1.167}$Ni$_{0.542}$Co$_{0.083}$Mn$_{0.208}$O$_{1.99}$F$_{0.01}$), was added to the reaction mixture, and this was stirred at a temperature of 80° C. to perform precipitation. The precipitate obtained by the precipitation was washed with distilled water, and the resultant was filtered.

The filtered resultant was dried at a temperature of 110° C. for 12 hours, and the dried resultant was heat-treated at a temperature of about 400° C. for 5 hours in a nitrogen atmosphere to obtain a composite cathode active material having a coating layer including AlF$_3$. Here, an amount of AlF$_3$ was about 1 part by weight based on 100 parts by weight of the total weight of the composite cathode active material.

Comparative Example 12: Preparation of Coin-Half Cell

A coin-half cell was prepared in the same manner as in Comparative Example 3, except that the cathode active material prepared in Comparative Example 11 was used instead of the cathode active material prepared in Comparative Example 1.

Examples 12 to 21 coin-half cells were prepared in the same manner as in Comparative Example 1, except that the composite cathode active materials prepared in Examples 1 to 10 were respectively used instead of the composite cathode active material prepared in Comparative Example 1.

Evaluation Example 1: Inductively Coupled Plasma-Atomic Emission Spectroscopy (ICP-AES) Analysis A doping amount of the composite cathode active materials prepared in Examples 1 to 6 and Comparative Examples 1 and 11 were measured by performing ICP-AES analysis. The results of the analysis are shown in Tables 1 and 2. The ICP-AES analysis was performed by using an ICPS-8100 available from Shimadzu.

TABLE 1

|  | ICP-AES (wt %) | | | | |
| --- | --- | --- | --- | --- | --- |
|  | Li | Mn | Co | Ni | Al |
| Example 1 | 8.9 | 33.3 | 5.5 | 13.6 | 0.34 |
| Example 2 | 8.9 | 32.9 | 5.5 | 13.3 | 0.95 |
| Example 4 | 9.0 | 33.1 | 5.3 | 13.5 | 0.34 |
| Example 5 | 8.9 | 32.8 | 5.4 | 13.4 | 0.95 |
| Example 6 | 8.7 | 32.1 | 5.3 | 13.1 | 1.52 |
| Comparative Example 1 | 9.2 | 34.2 | 5.7 | 13.8 | — |
| Comparative Example 11 | 8.6 | 34.2 | 5.6 | 14.1 | 0.31 |

TABLE 2

|  | Mole ratio (%) | | | |
| --- | --- | --- | --- | --- |
|  | Li | Mn | Co | Ni |
| Comparative Example 1 | 0.581 | 0.274 | 0.042 | 0.103 |
| Example 1 | 0.579 | 0.274 | 0.042 | 0.105 |
| Example 2 | 0.582 | 0.273 | 0.042 | 0.103 |
| Example 3 | 0.582 | 0.273 | 0.042 | 0.103 |
| Example 4 | 0.582 | 0.272 | 0.042 | 0.104 |
| Example 5 | 0.582 | 0.272 | 0.042 | 0.104 |
| Example 6 | 0.583 | 0.274 | 0.042 | 0.104 |

As shown in Tables 1 and 2, from the ICP-AES analysis results of the composite cathode active materials prepared in Examples 1 to 6, it may be seen that there was no lithium loss during a process of forming the coating layer. Also, as shown in Table 2, the composite cathode active materials prepared in Examples 1 to 6 show the results of maintaining almost the same mole ratio of lithium, manganese, cobalt, and nickel.

On the contrary, when washing was performed in the same manner as used in Comparative Example 11, lithium loss may occur, and thus it is difficult to obtain a composite cathode active material having the desired composition.

Evaluation Example 2: X-Ray Diffraction (XRD)

X-ray powder diffraction (XRD) analysis using CuKα radiation was performed on the composite cathode active materials prepared in Examples 1 to 6 and the cathode active material prepared in Comparative Example 1. The XRD analysis was performed using a Rigaku RINT2200HF+ diffractometer using CuKα radiation (1.540598 angstroms (Å)).

Figure 4B:
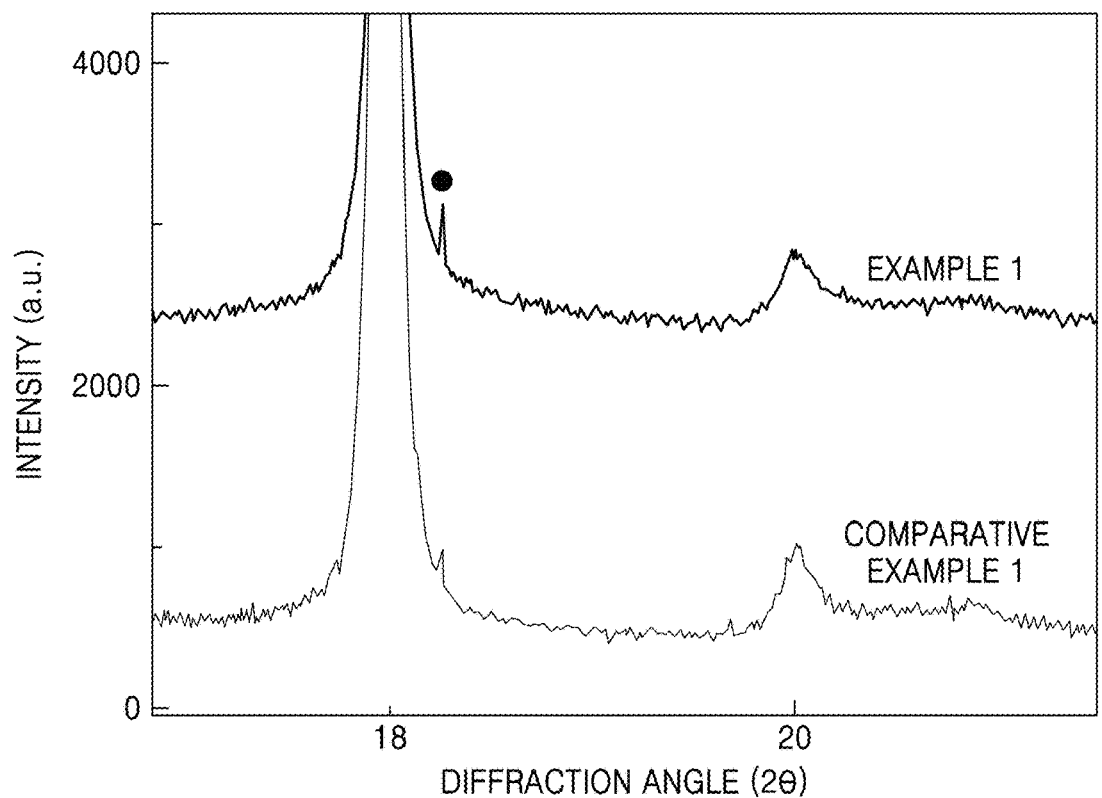
FIGS. 4B and 4C are graphs of intensity (arbitrary units, a.u.) versus diffraction angle (degrees two-theta, $2\theta$) which show the results of low-angle X-ray diffraction analysis performed on the composite cathode active material prepared in Example 1 and the cathode active material prepared in Comparative Example 1.
Figure 4C:
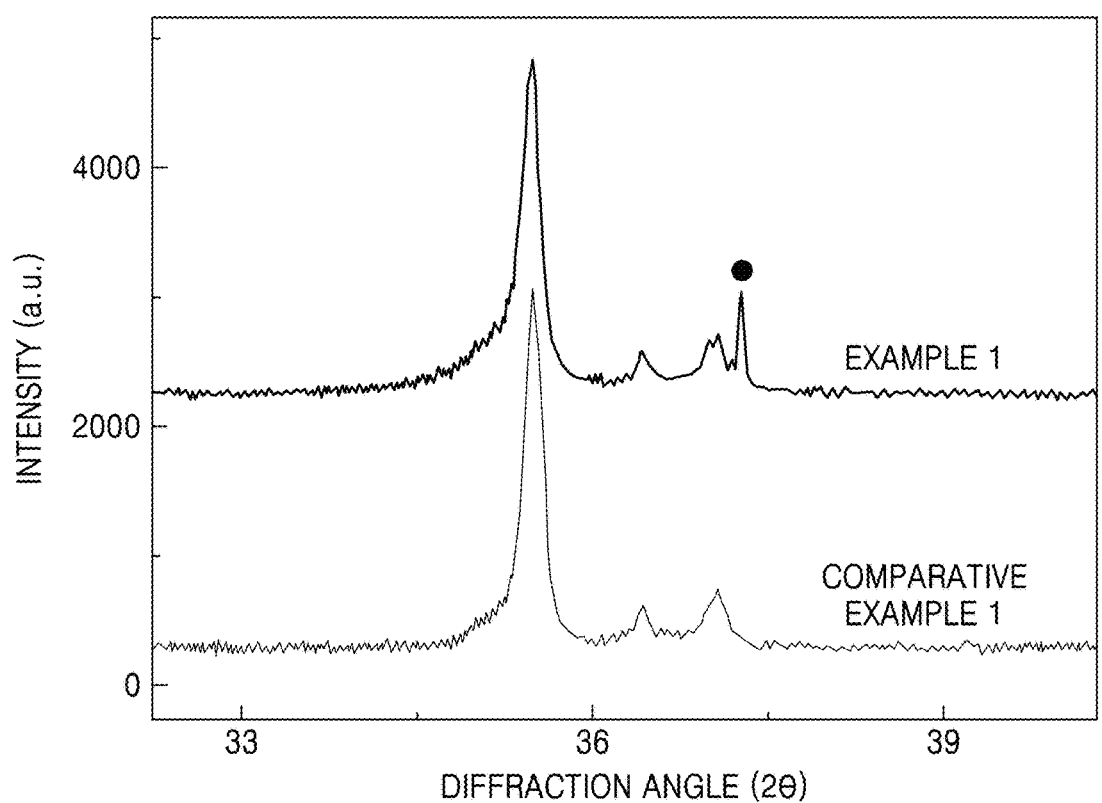

The results of the XRD analysis performed on the composite cathode active materials prepared in Examples 1 to 6 and the cathode active material prepared in Comparative Example 1 are as shown in FIG. 4A. Also, the results of low-angle XRD analysis performed on the composite cathode active material prepared in Example 1 and the cathode active material prepared in Comparative Example 1 are shown in FIGS. 4B and 4C.

Referring to FIG. 4A, the composite cathode active materials prepared in Examples 1 to 6 did not show peaks other than those corresponding to aluminum oxide and lithium fluoride, and thus it may be confirmed that no significant structural change in the composite cathode active material may occur in spite of increasing an amount of the coating.

Referring to FIG. 4B, the composite cathode active material prepared in Example 1 showed a weak peak of lithium fluoride (LiF) at a region where diffraction angle 2θ is about 12°, unlike the composite cathode active material prepared in Comparative Example 1. Also, as shown in FIG. 4C, the composite cathode active material prepared in Example 1 showed a peak of LiF at a region where diffraction angle 2θ is between about 36.8° to about 37°, unlike the composite cathode active material prepared in Comparative Example 1.

Evaluation Example 3: Charging/Discharging Characteristics (Initial Characteristics)

The coin-half cells prepared in Examples 12-19 and Comparative Examples 3 and 10 were charged with a constant current of 0.1 C until a voltage of each of the cells was 4.5 V, and then were discharged with a constant current of 0.1 C until a voltage of each of the cells was 2.0 V.

From the $2^{nd}$ cycle of the charging/discharging, the cells were each charged with a constant current of 0.5 C until a voltage of each of the cells was 4.5 V (4.5V CC 0.5 C), and then discharged with a constant current of 0.2 C/1 C/2 C until a voltage of each of the cells was 2.0 V (2.0 V, 0.2 C/1 C/2 C).

The initial charging/discharging efficiency was calculated according to Equation 1.

Initial charging/discharging efficiency={($1^{st}$ cycle discharge capacity)/($1^{st}$ cycle charge capacity)}×100%   Equation 1

The charging/discharging characteristics of the $1^{st}$ cycle were evaluated by using a charging/discharging meter (TOYO-3100, available from TOYO), and the results of the evaluation are shown in Table 3.

TABLE 3

|  | Charge capacity (mAh/g) | Discharge capacity (mAh/g) | Initial charging/ discharging efficiency (%) |
| --- | --- | --- | --- |
| Example 12 | 281.59 | 255.67 | 90.8 |
| Example 13 | 257.24 | 245.90 | 95.59 |
| Example 14 | 237.36 | 234.97 | 98.99 |
| Example 15 | 268.51 | 249.86 | 93.05 |
| Example 16 | 265.12 | 253.76 | 95.72 |
| Example 17 | 246.74 | 239.20 | 96.94 |
| Example 18 | 256.70 | 242.42 | 94.44 |
| Example 19 | 288.34 | 265.66 | 92.13 |

TABLE 3-continued

|  | Charge capacity (mAh/g) | Discharge capacity (mAh/g) | Initial charging/ discharging efficiency (%) |
| --- | --- | --- | --- |
| Comparative Example 3 | 299.96 | 266.46 | 88.83 |
| Comparative Example 10 | 293.31 | 251.06 | 85.6 |

As shown in Table 3, the coin-half cells prepared in Examples 12 to 19 showed improved initial charging/discharging characteristics as their initial charging/discharging efficiency was excellent compared to those of the coin-half cells prepared in Comparative Examples 3 and 10. Also, it may be seen that, according to an amount of the aluminum oxide and lithium fluoride increased in the composite cathode active material, a capacity of the cell increased as a spinel phase between the OLO and the coating layer increased.

Evaluation Example 4: Charging/Discharging Characteristics (Capacity Retention Rate and Rate Capability)

1) Examples 12 to 21 and Comparative Examples 3 and 9

The coin-half cells prepared in Examples 12 to 21 and Comparative Examples 3 and 9 were charged with a constant current of 0.1 C until a voltage of each of the cells was 4.5 V, and were discharged with a constant current of 0.1 C until a voltage of each of the cells was 2.0 V.

From the $2^{nd}$ cycle of the charging/discharging, the cells were each charged with a constant current of 0.5 C until a voltage of each of the cells was 4.5 V (4.5 V CC/0.5 C), and then were discharged with a constant current of 0.2C/0.3C/1C/2C/3C until a voltage of each of the cells was 2.0 V (2.0V,0.2C/0.3C/1 C/2C/3C).

The cycle evaluation was performed by 50 cycles of charging with a constant current of 1 C until a voltage of each of the cells was 4.5 V (4.5 V CC 1 C) and discharging with a constant current of 1C until a voltage of each of the cells was 2.0 V (2.0 V 1 C).

The capacity retention rate and the rate capability were calculated using Equations 2 and 3. Also, the capacity retention rate and the rate capability are shown in Table 4.

Capacity retention rate [%]=[$50^{th}$ cycle discharge capacity/$1^{st}$ cycle discharge capacity]×100%   Equation 2

Rate capability={(2 C or 3 C discharge capacity)/(0.2 C or 0.3 C discharge capacity)}×100%   Equation 3

The capacity retention rate and the rate capability are shown in Table 4.

TABLE 4

|  | Capacity retention rate ($50^{th}$) | Rate capability (%) (2C/0.2C) | Rate capability (%) (3C/0.3C) |
| --- | --- | --- | --- |
| Example 12 | 91.50 | 85 | 83 |
| Example 13 | 94.87 | 84 | 82 |
| Example 14 | 93.40 | 86 | 79 |
| Example 15 | 92.96 | 84 | 82 |
| Example 16 | 94.07 | 82 | 79 |
| Example 17 | 92.50 | 82 | 77 |
| Example 18 | 90.16 | 83 | 80 |
| Example 19 | 93.31 | 86 | 84 |

TABLE 4-continued

|  | Capacity retention rate (50$^{th}$) | Rate capability (%) (2C/0.2C) | Rate capability (%) (3C/0.3C) |
|---|---|---|---|
| Example 20 | 91.65 | 80 | 77 |
| Example 21 | 91.96 | 85 | 80 |
| Comparative Example 3 | 89.1 | 80 | 76 |
| Comparative Example 9 | 93.44 | 72 | 68 |

Referring to Table 4, it may be seen that the coin-half cells prepared in Examples 12 to 21 showed the rate capability and the capacity retention rate that were at the same or higher than those of the coin-half cell prepared in Comparative Example 3. The coin-half cell prepared in Comparative Example 9 showed good results for the capacity retention rate as shown in Table 4, but showed deteriorated rate capability compared to that of the coin-half cells prepared in Examples 12 to 21.

2) Example 12 and Comparative Examples 3, 4, 8, and 10

The coin-half cells prepared in Example 12 and Comparative Examples 3, 4, 8, and 10 were charged with a constant current of 0.1 C until a voltage of each of the cells was 4.5 V, and were discharged with a constant current of 0.1 C until a voltage of each of the cells was 2.0 V.

From the 2$^{nd}$ cycle of the charging/discharging, the cells were each charged with a constant current of 0.5 C until a voltage of each of the cells was 4.5 V (4.5 V CC/CV 0.5 C), and then were discharged with a constant current of 0.2 C/1 C/2 C until a voltage of each of the cells was 2.0 V (2.0 V, 0.2 C/1 C/2 C). The cycle was performed by charging with a constant current of 1 C until a voltage of each of the cells was 4.5 V (4.5 V CC 1 C) and discharging with a constant current of 1C until a voltage of each of the cells was 2.0 V (2.0 V 1 C). The charging/discharging cycle was repeated 30 times.

The capacity retention rate and the rate capability were calculated using Equations 2 and 3. Also, the capacity retention rate and the rate capability are shown in Table 5.

Capacity retention rate [%]=[50$^{th}$ cycle discharge capacity/1$^{st}$ cycle discharge capacity]×100%  Equation 2

Rate capability={(2 C discharge capacity)/(0.2 C discharge capacity)}×100%  Equation 3

The results of capacity retention rate and the rate capability are shown in Table 5.

TABLE 5

|  | Capacity retention rate (%) | Rate capability (%) (2C/0.2C) |
|---|---|---|
| Example 12 | 83 | 94.87 |
| Comparative Example 3 | 76 | 89.5 |
| Comparative Example 4 | 78 | 91.6 |
| Comparative Example 8 | 73 | 95.2 |
| Comparative Example 10 | 68 | 94 |

As shown in Table 5, the coin-half cell prepared in Example 12 showed improved capacity retention rate and rate capability as compared to the coin-half cells prepared in Comparative Examples 3, 4, 8, and 10.

Evaluation Example 5: Scanning Electron Microscope (SEM) Analysis

Scanning electron microscope (SEM) analysis was used to evaluate the composite cathode active materials prepared in Examples 1, 2, 4, and 5, and the results are shown in FIGS. 6 to 9. The SEM analysis was performed using an SEM analysis instrument S-5500 (available from Hitachi).

Referring to FIGS. 6 to 9, it may be seen that a continuous coating layer was formed on a surface of the composite cathode active materials prepared in Examples 1, 2, 4, and 5.

Evaluation Example 6: X-Ray Photoelectron Spectroscopy (XPS)

XPS analysis was performed on the composite cathode active materials prepared in Examples 1 to 6 and the cathode active material prepared in Comparative Example 1 using a Quantum 2000 (available from Physical Electronics).

The XPS analysis results are shown in FIGS. 5A to 5J.

The composite cathode active materials prepared in Examples 1 to 3 were heat-treated in a nitrogen atmosphere, whereas the composite cathode active materials prepared in Examples 4 to 6 were heat-treated in an air atmosphere. In comparison of the XPS analysis results of Examples 1 to 3 and the XPS analysis results of Examples 4 to 6, it may be seen that there was almost no change in a composition of the coating layer even when the heat-treatment atmosphere was changed. It can also be seen that the coating layer of the composite cathode active materials prepared in Examples 1 to 6 contained aluminum oxide and lithium fluoride.

Figure 5A:
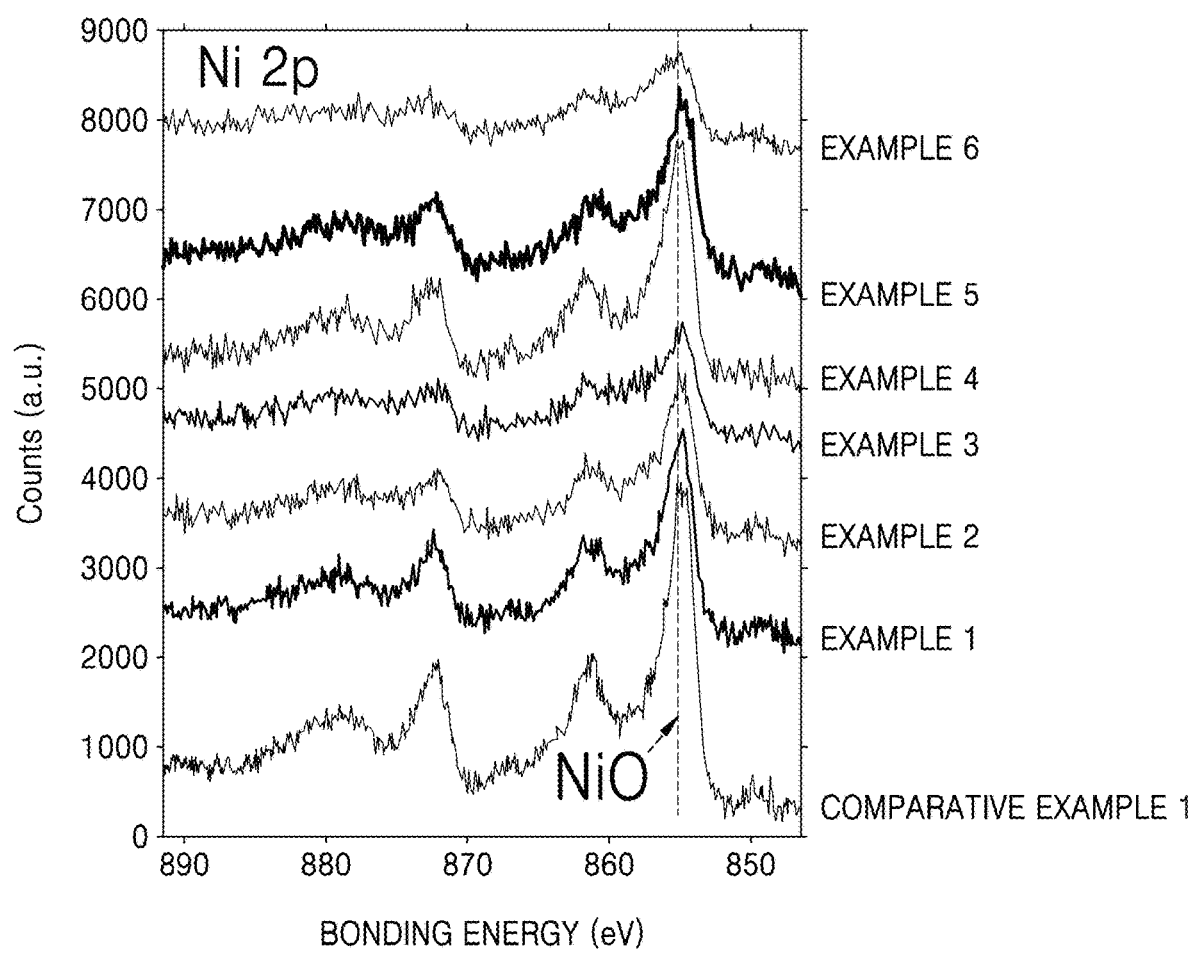
Figure 5B:
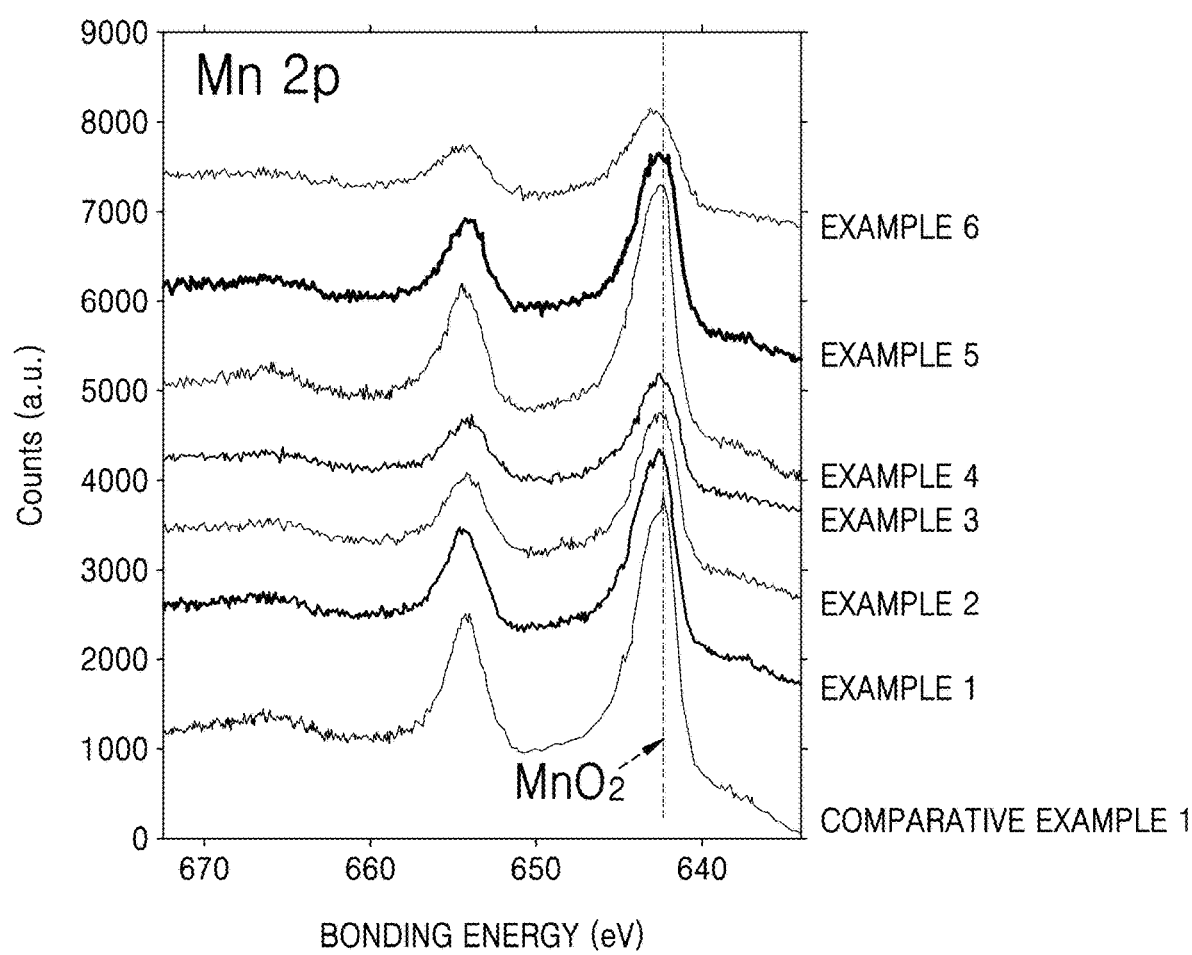
Figure 5D:
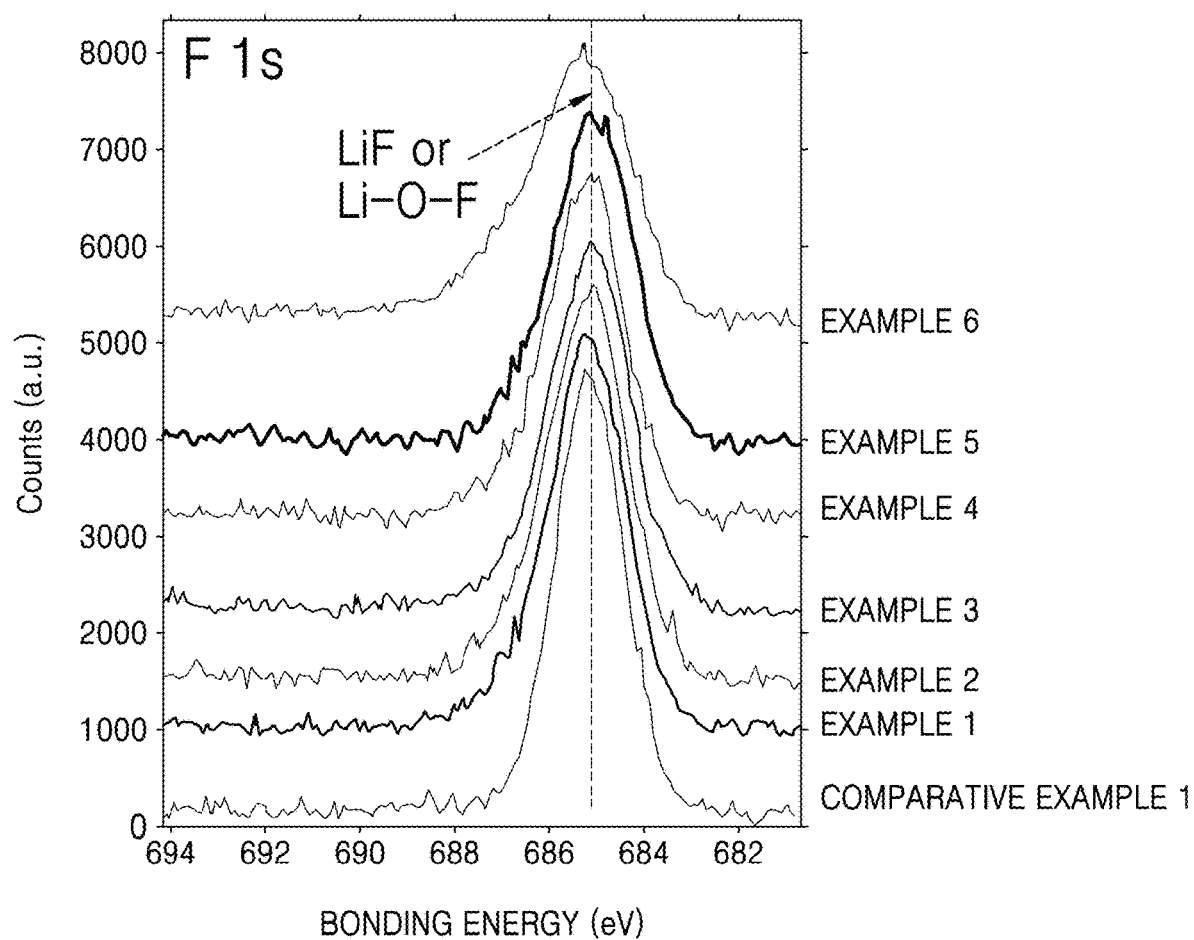
Figure 5E:
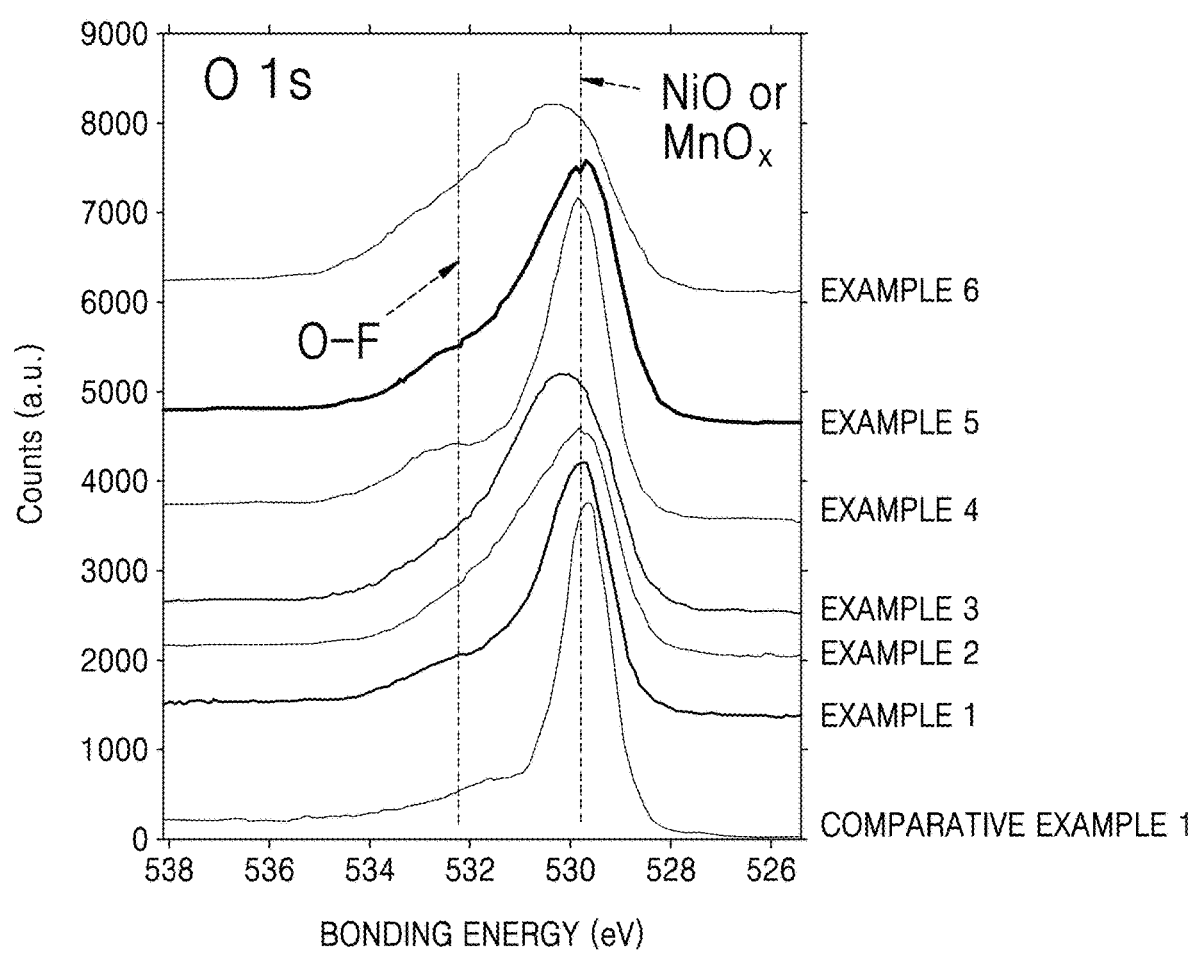
Figure 5F:
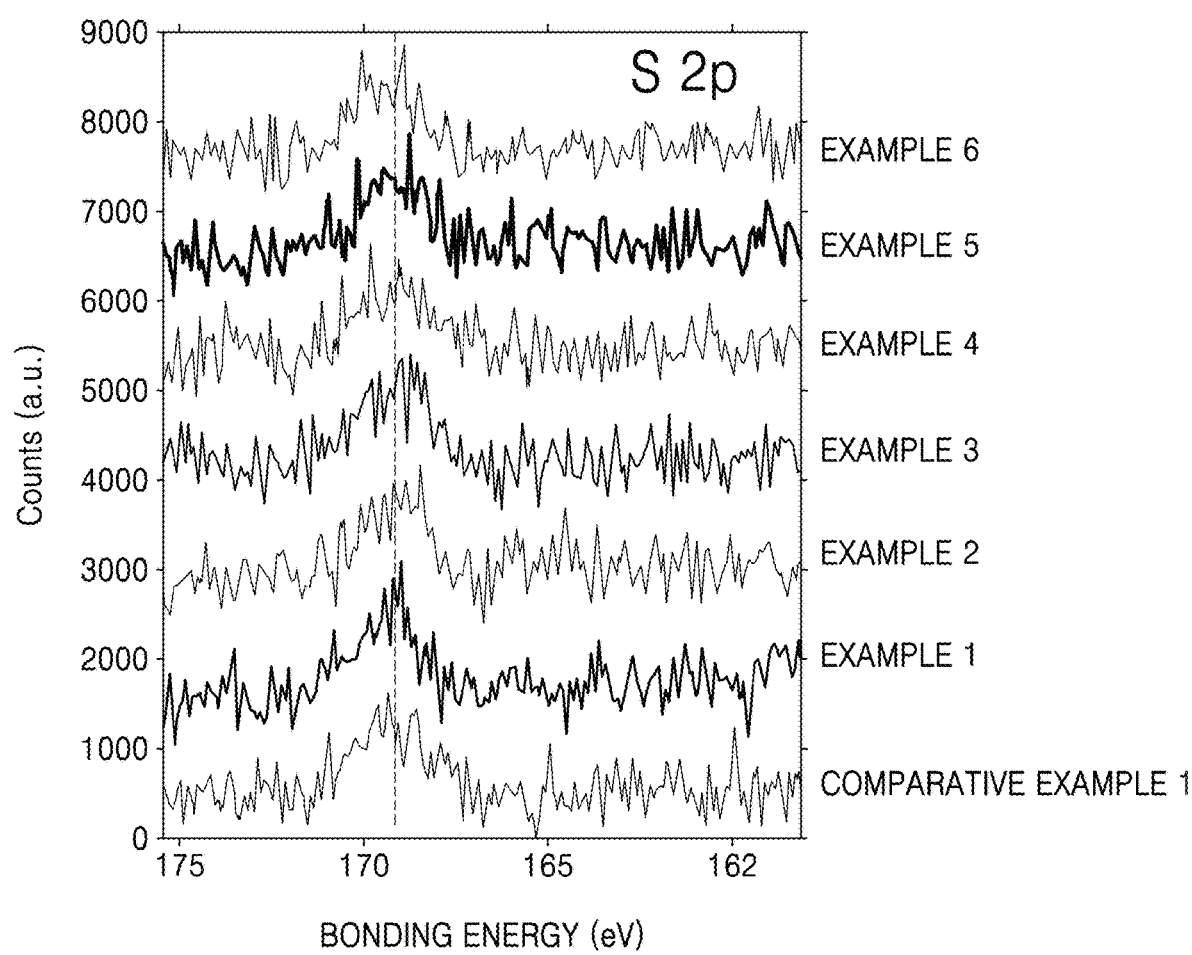
Figure 5G:
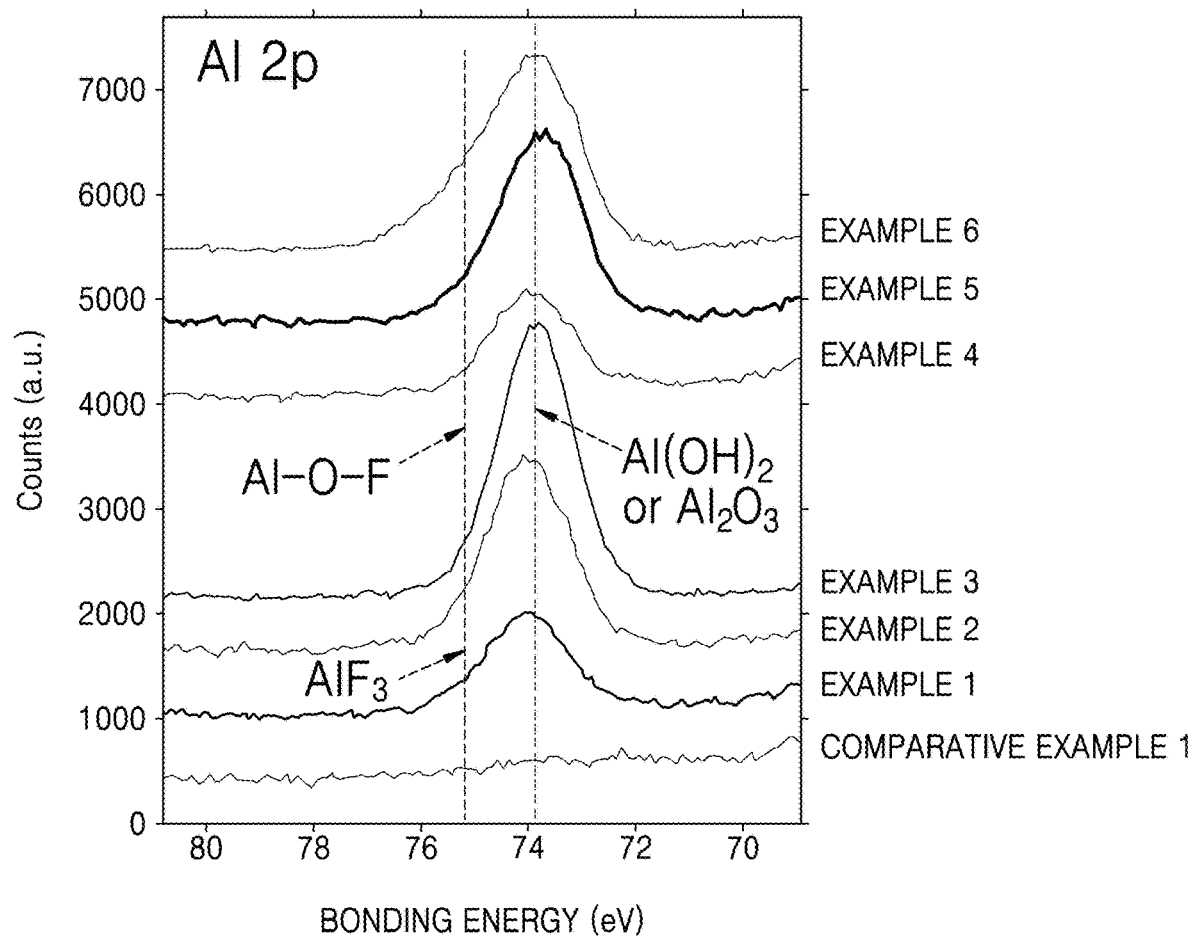
Figure 5H:
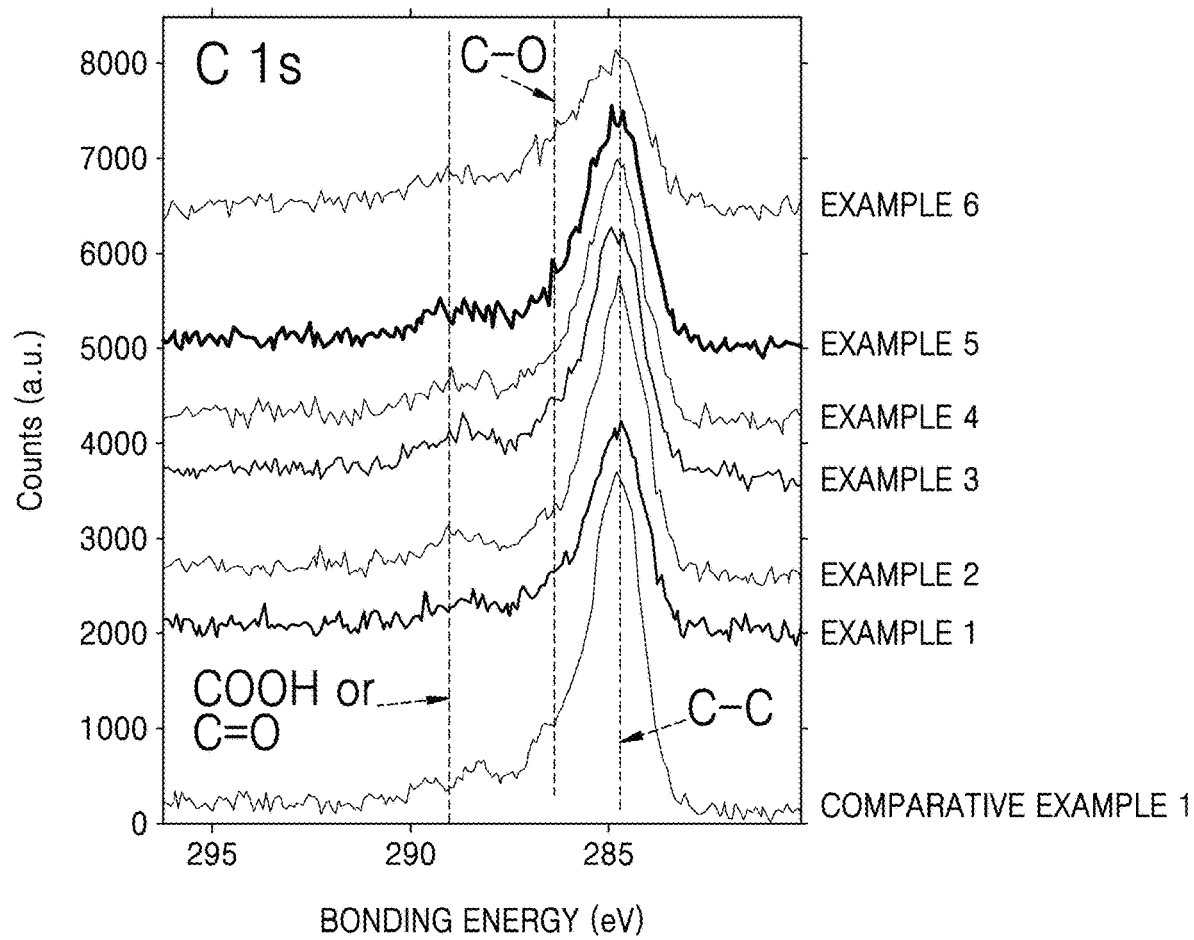
Figure 5I:
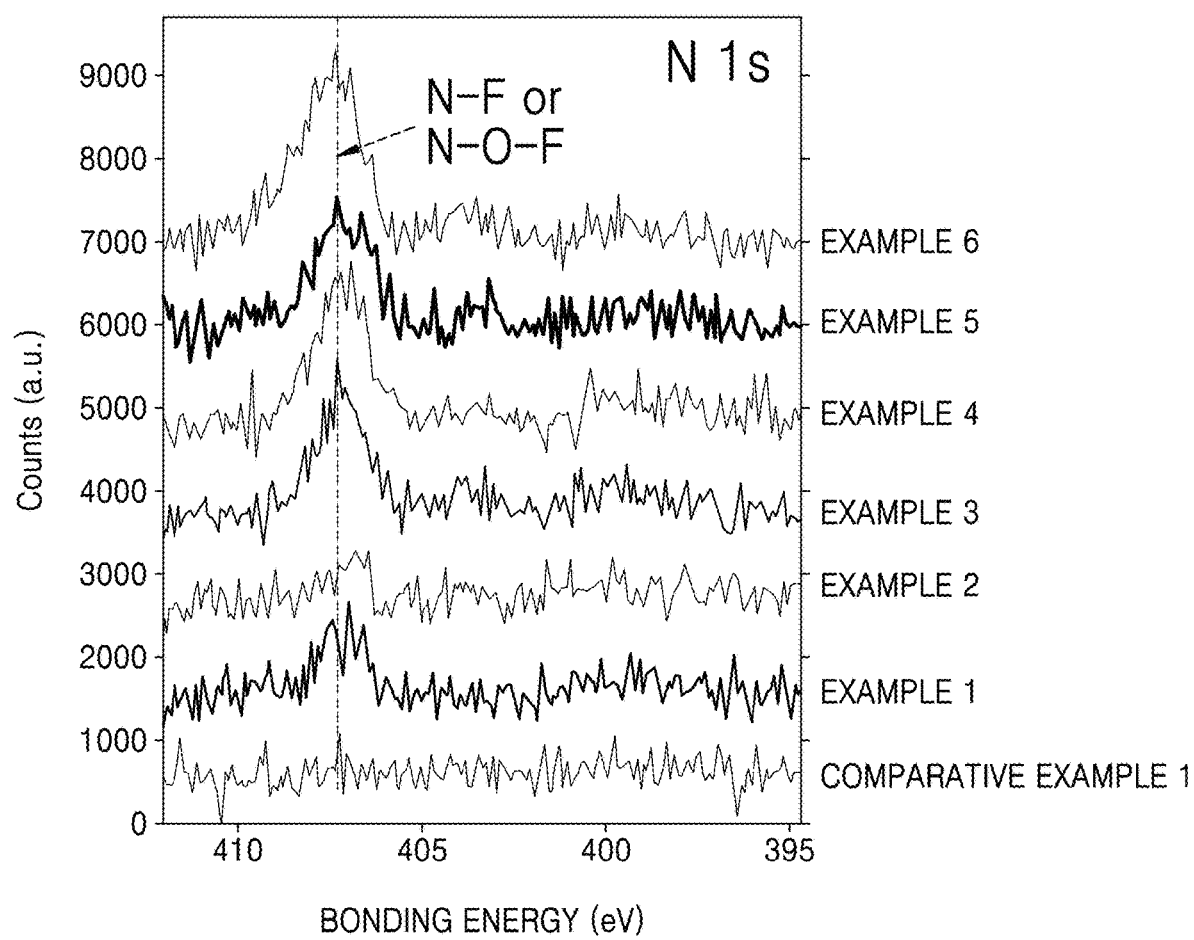
Figure 5J:
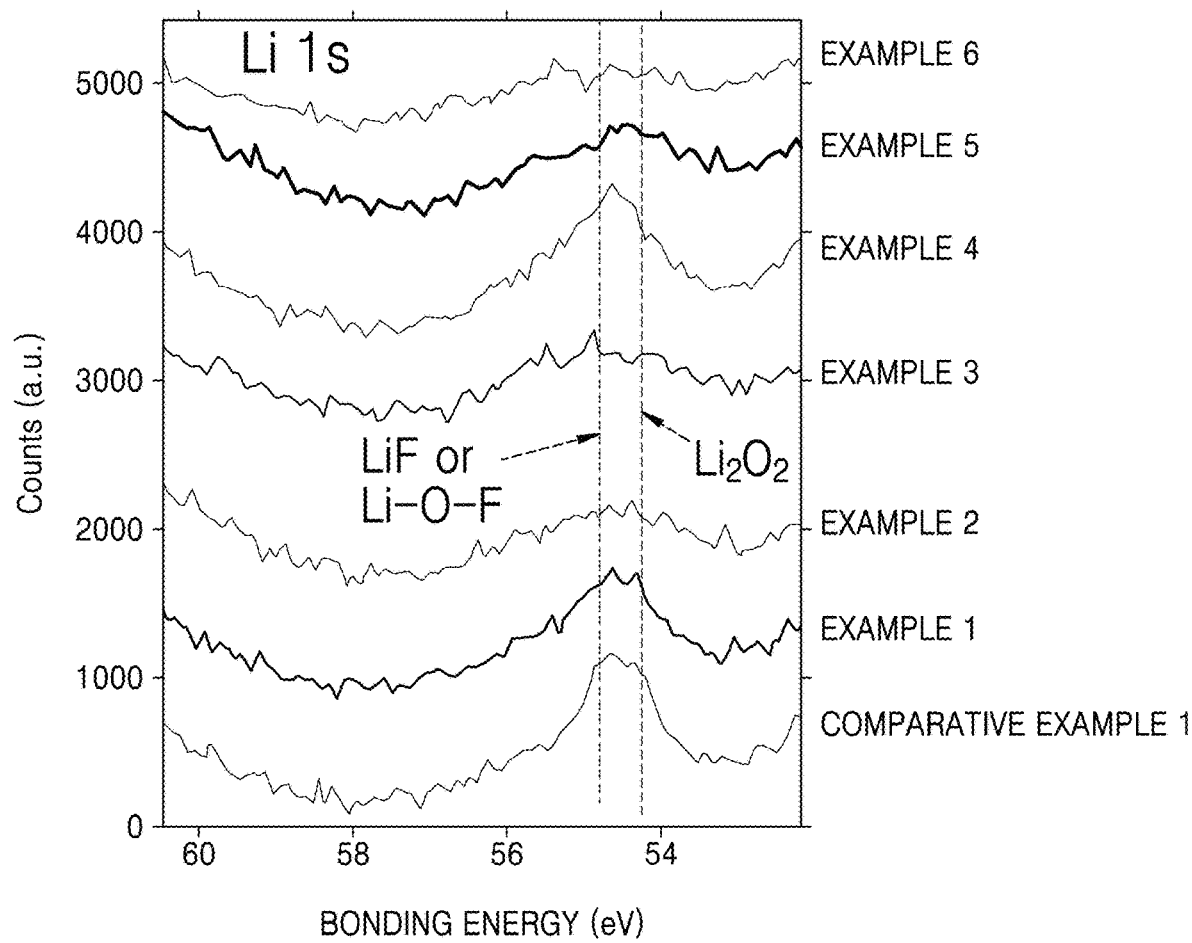
Figure 6:
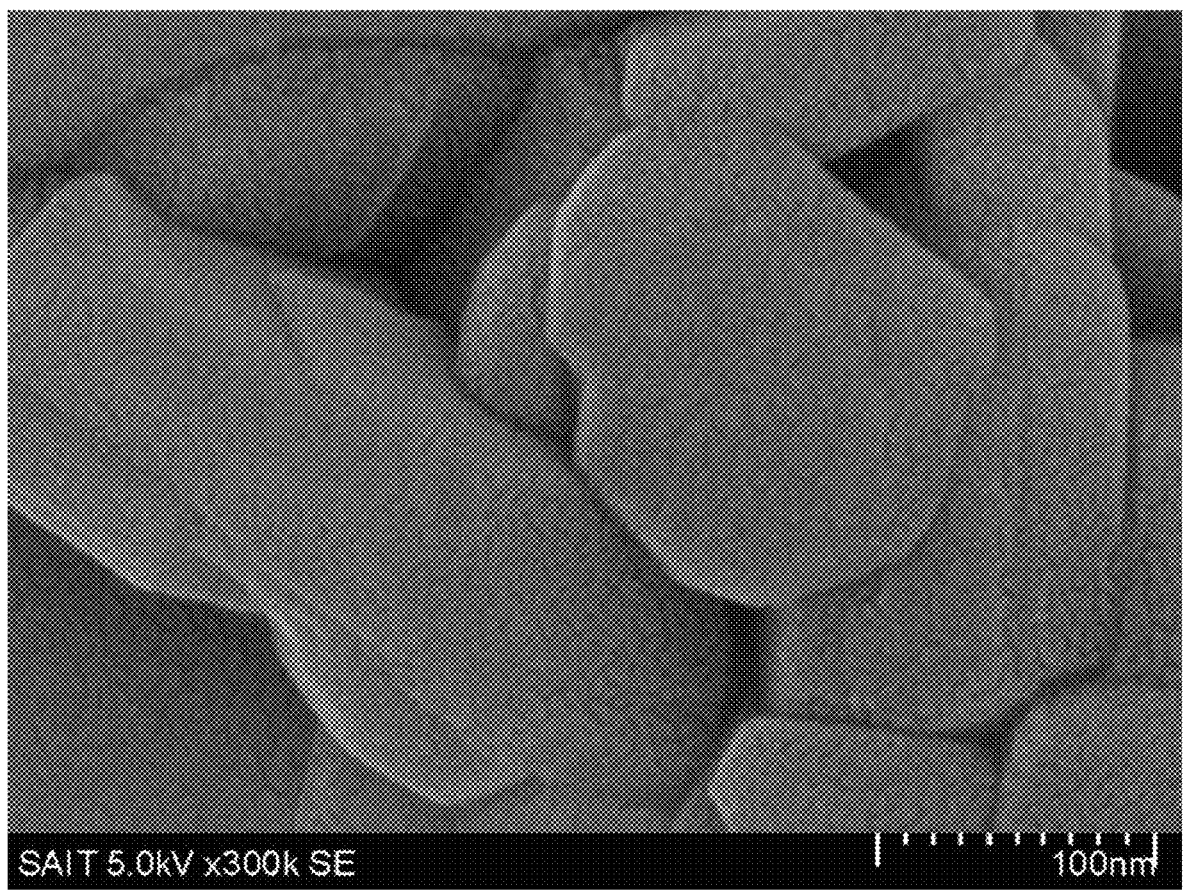
FIGS. 6 to 9 show the results of scanning electron microscope (SEM) analysis performed on the composite cathode active materials prepared in Examples 1, 2, 4, and 5, respectively.
Figure 7:
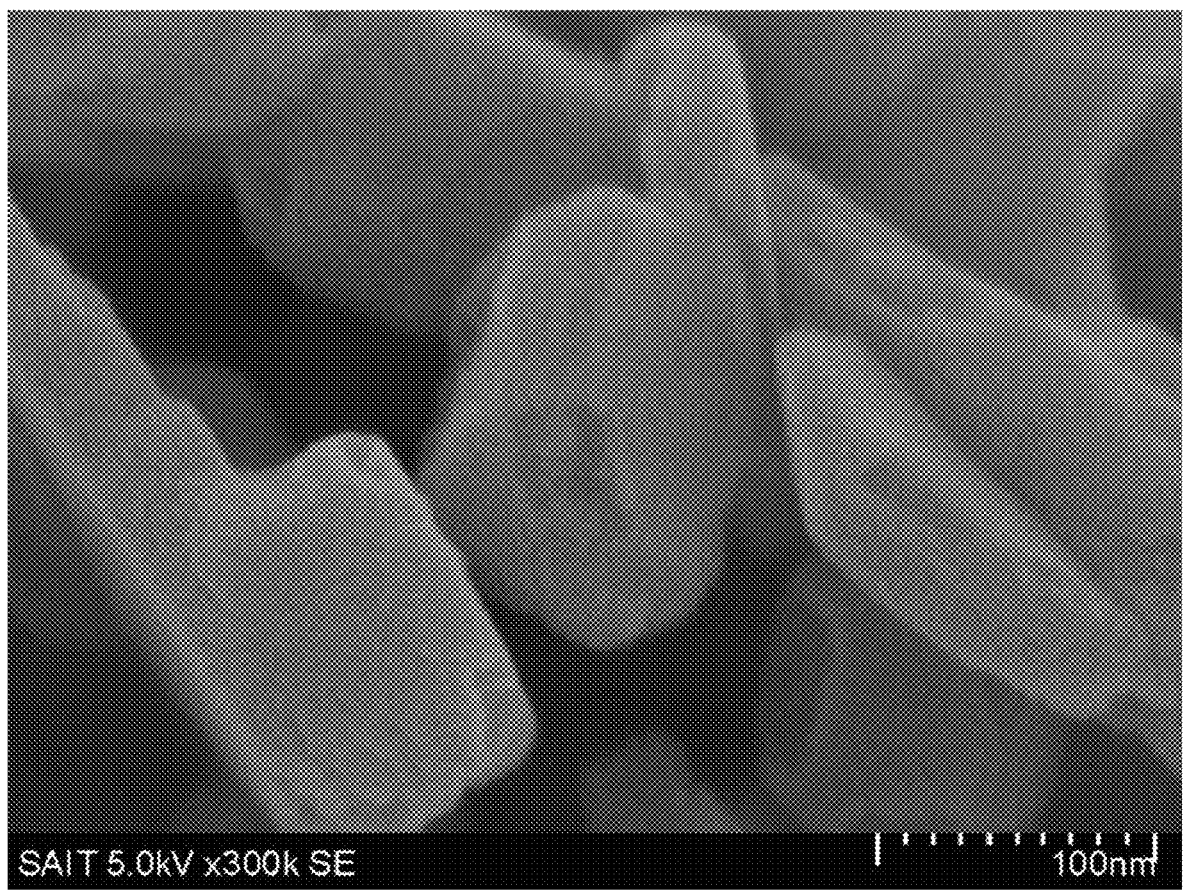
Figure 8:
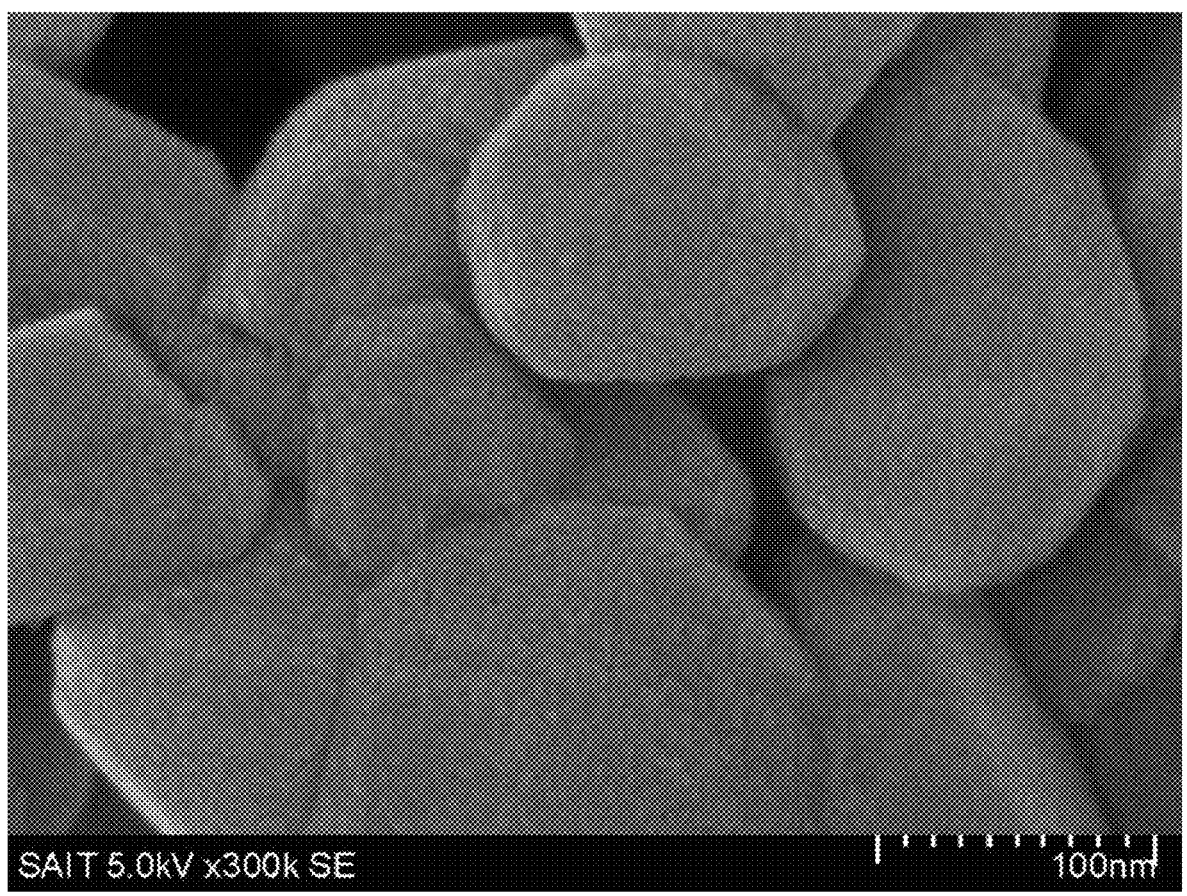
Figure 9:
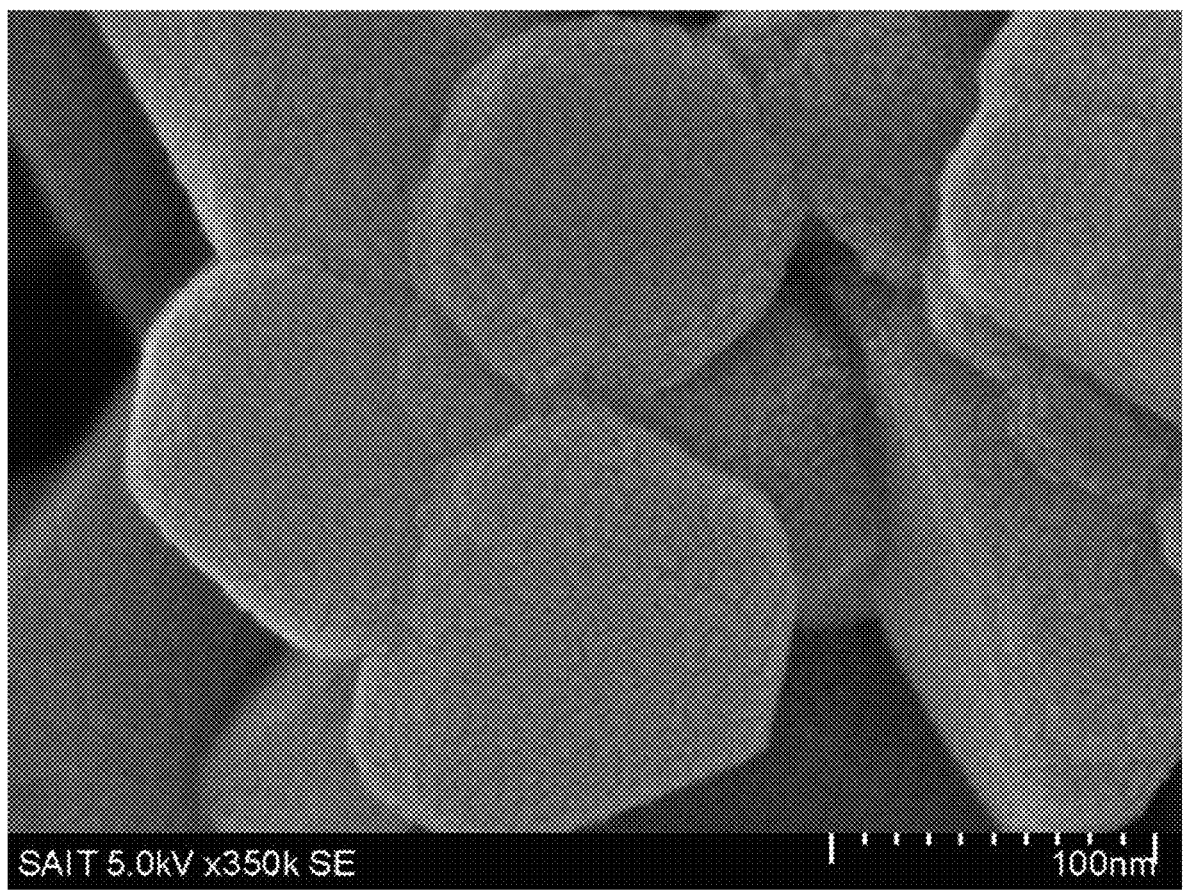

In view of the F1s peak (a binding energy between from 683 eV to 688 eV) of FIG. 5D and the Al2p peak (a binding energy between from 72 eV to 75 eV) of FIG. 5G, it may be seen that the coating layer is formed of lithium fluoride and aluminum oxide.

Evaluation Example 7: Remaining Lithium

Amounts of remaining LiOH and Li$_2$CO$_3$ in the composite cathode active material prepared in Example 4 and the cathode active material prepared in Comparative Example 1 were measured and the total amount of remaining lithium was calculated therefrom. The results of the measurements are shown in Table 6.

TABLE 6

|  | Amount of lithium hydroxide (ppm) | Amount of lithium carbonate (ppm) | Total amount of remaining lithium (ppm) |
|---|---|---|---|
| Example 4 (before heat-treatment) | 70 | 96 | 163 |
| Example 4 (after heat-treatment) | 12.7 | 22.3 | 34.7 |
| Comparative Example 1 | 193 | 48.1 | 241.1 |

In Table 6, the total amount of the remaining lithium is the sum of an amount of lithium hydroxide and an amount of lithium carbonate. As shown in Table 6, it may be seen that the composite cathode active material prepared in Example 4 has a decreased amount of remaining lithium as compared to the composite cathode active material prepared in Comparative Example 1. In this regard, when an amount of the remaining lithium is decreased, the instability of the cathode slurry, which occurs due to high amounts of remaining lithium in a conventional composite cathode active material, and the problem of gas generation in a battery which occurs after employing the composite cathode active material, may be resolved.

Evaluation Example 8: Conductivity

Conductivity of the composite cathode active materials prepared in Examples 1 to 6 and the cathode active material prepared in Comparative Example 1 was evaluated. The conductivity was measured using an alternating current impedance method.

Resistance of the composite cathode active materials prepared in Examples 1 to 6 and the cathode active material prepared in Comparative Example 1 was measured while applying a voltage bias of 10 millivolts (mV) within a frequency range of about 1 hertz (Hz) to about 1 megahertz (MHz) thereto. The results are shown in Table 7.

TABLE 7

|  | Conductivity (S/cm) |
| --- | --- |
| Example 1 | $1.46 \times 10^{-8}$ |
| Example 2 | $1.24 \times 10^{-6}$ |
| Example 3 | $4.1 \times 10^{-6}$ |
| Example 4 | $1.21 \times 10^{-8}$ |
| Example 5 | $1.08 \times 10^{-6}$ |
| Example 6 | $3.51 \times 10^{-6}$ |
| Comparative Example 1 | $2.07 \times 10^{-9}$ |

Referring to Table 7, the conductivities of the composite cathode active materials prepared in Examples 1 to 6 were improved compared to the cathode active material prepared in Comparative Example 1. Without being limited by theory, it is believe this resulted due to reduction of $Li_2MnO_3$ phase or improvement of high rate characteristics.

Evaluation Example 9: Transmission Electron Microscopy (TEM)

High-resolution scanning transmission electron microscopy (HRSTEM) analysis was performed on the composite cathode active material of Example 1 and the cathode active material of Comparative Example 1. The HRSTEM analysis was performed using a Titan cubed 60-300, available from FEI as an analysis instrument.

Figure 10A:
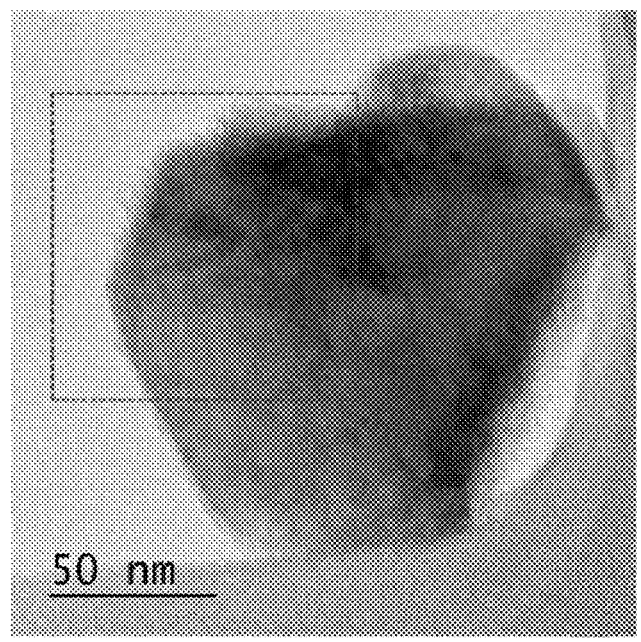
FIGS. 10A to 10D show the results of high resolution scanning transmission electron microscope (HRSTEM) analysis performed on the composite cathode active material prepared in Example 1.
Figure 10B:
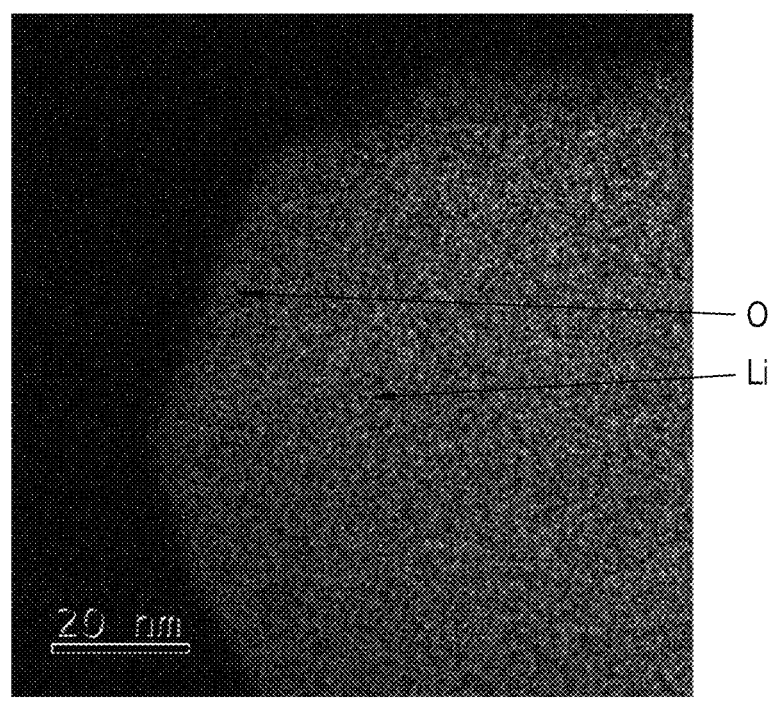
Figure 10C:
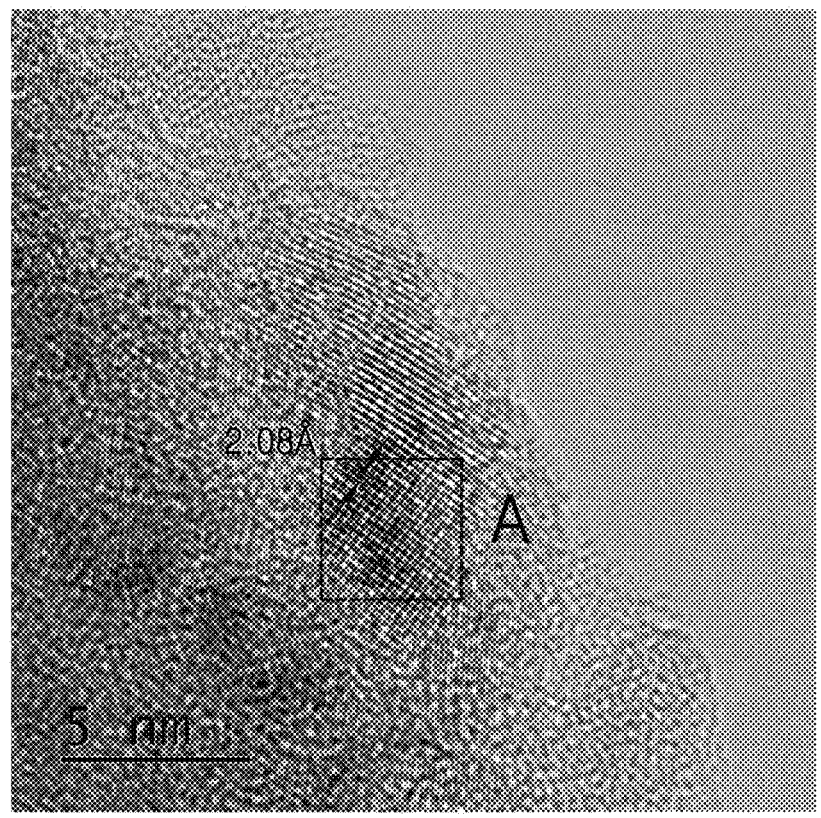
Figure 10D:
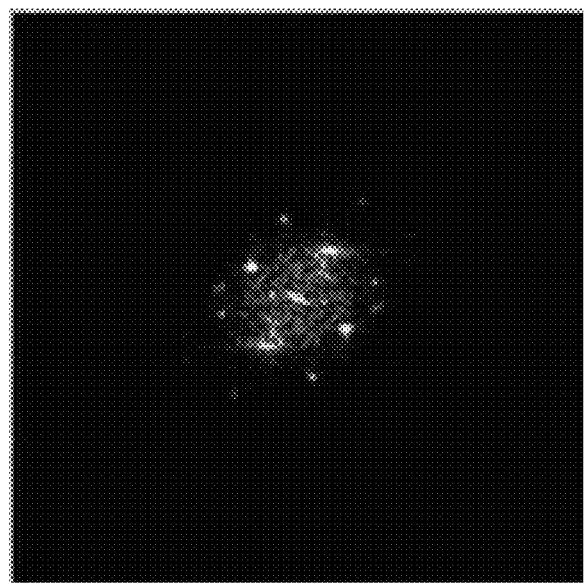

The results of the HRSTEM analysis performed on the composite cathode active material of Example 1 is shown in FIGS. 10A to 10C. FIG. 10B is a magnified view of a squared region in FIG. 10A. Also, the results of the HRSTEM analysis performed on the cathode active material of Comparative Example 1 are shown in FIG. 10D.

As shown in FIGS. 10A and 10B, it may be seen that oxygen (O) in the composite cathode active material of Example 1 is distributed toward the outside relative to the lithium distribution. In this regard, it may be seen that the alumina is present on an outside of lithium-containing particles. As shown in FIGS. 10C and 10D, crystal grains having a cubic structure were observed on a surface of the particles, and it may be confirmed that a spinel phase (region A) was observed as a surface structure changes according to formation of the coating layer.

Figure 10E:
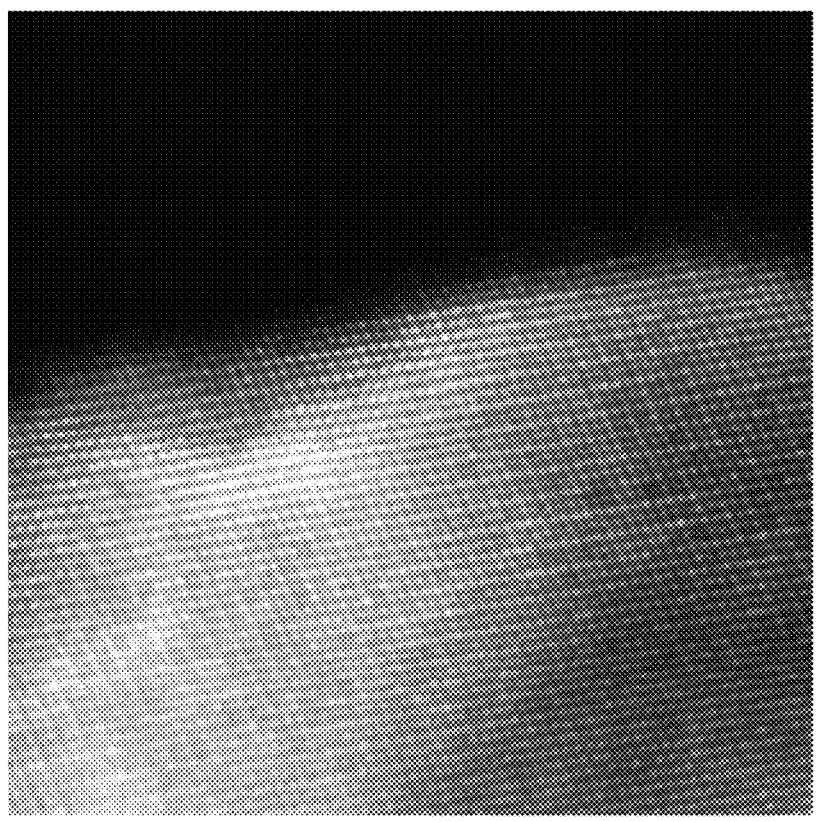
FIG. 10E shows the results of HRSTEM analysis performed on the cathode active material prepared in Comparative Example 1.

On the contrary, as shown in FIG. 10E, an atomic position having a transition metal was clearly observed in the cathode active material of Comparative Example 1, but other phases were not observed.

Evaluation Example 10: Transmission Electron Microscopy (TEM)/Energy Dispersive Spectrometer (EDS) Mapping Analysis TEM/EDS mapping analysis was performed on the cathode active material prepared in Example 1, and the results of the analysis are shown in FIGS. 11A to 11G.

Figure 11A:
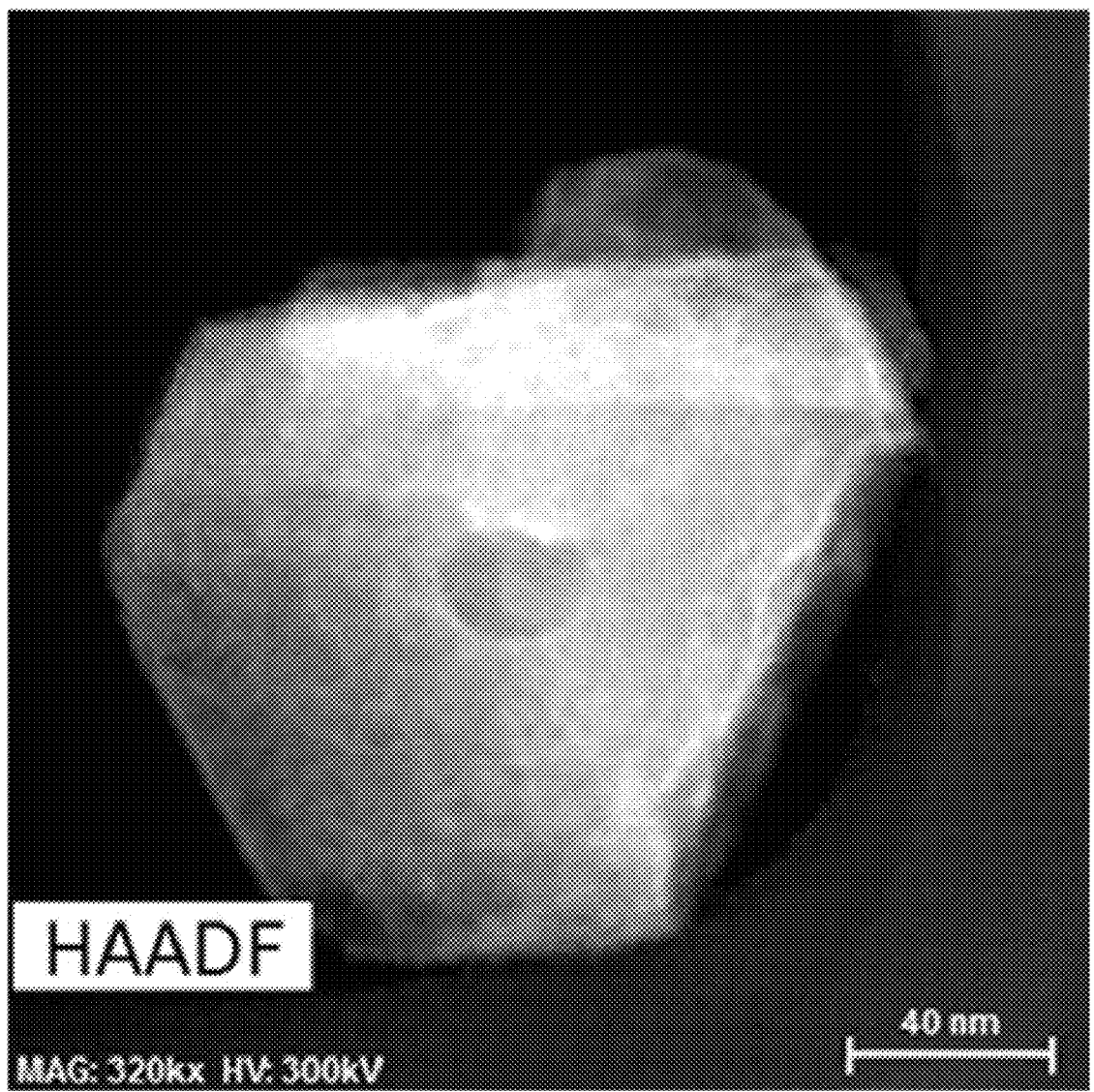
FIGS. 11A to 11H show the results of transmission electron microscope (TEM)/energy dispersive X-ray spectrum (EDS) mapping analysis performed on the composite cathode active material prepared in Example 1.
Figure 11B:
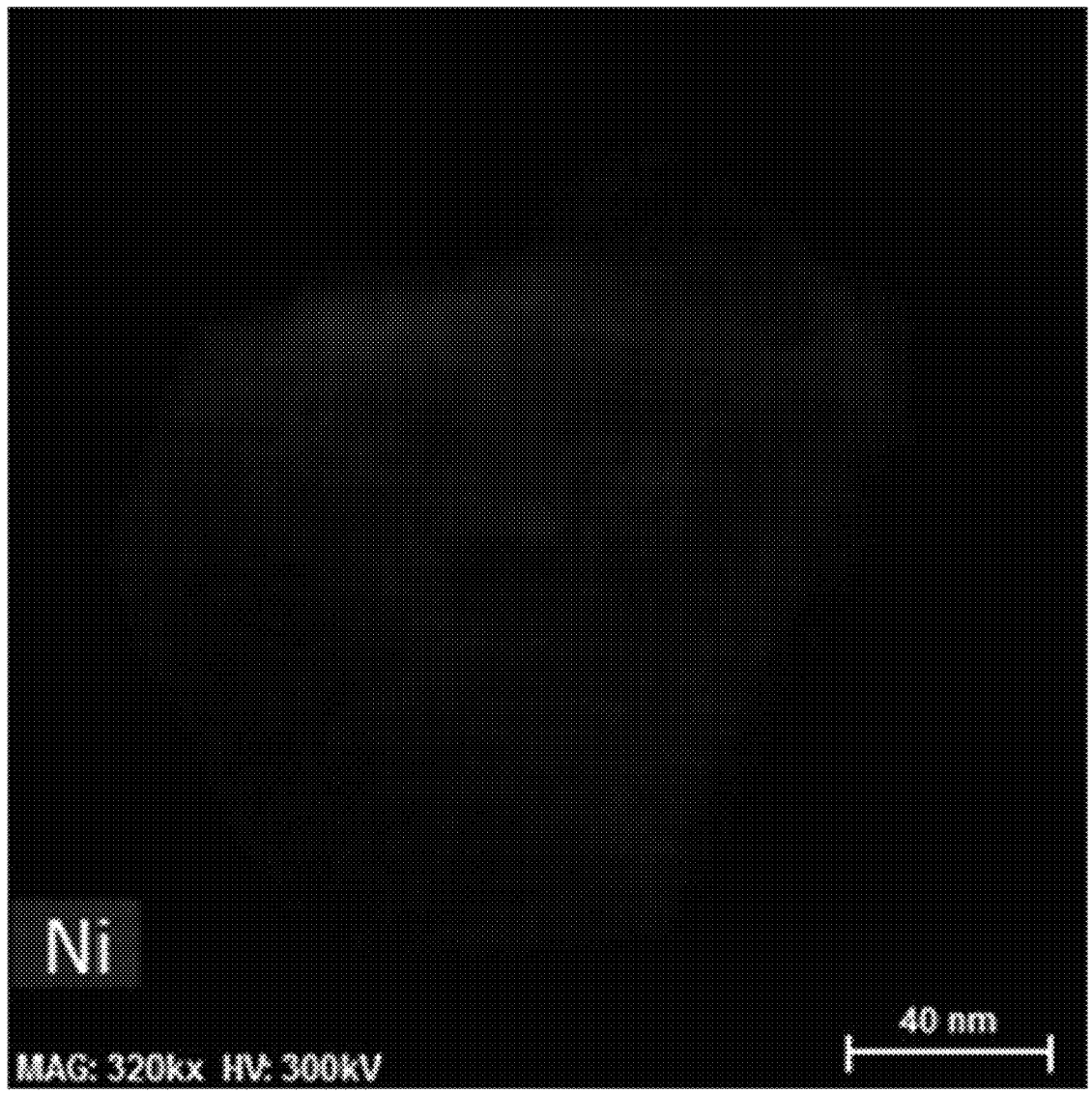
Figure 11C:
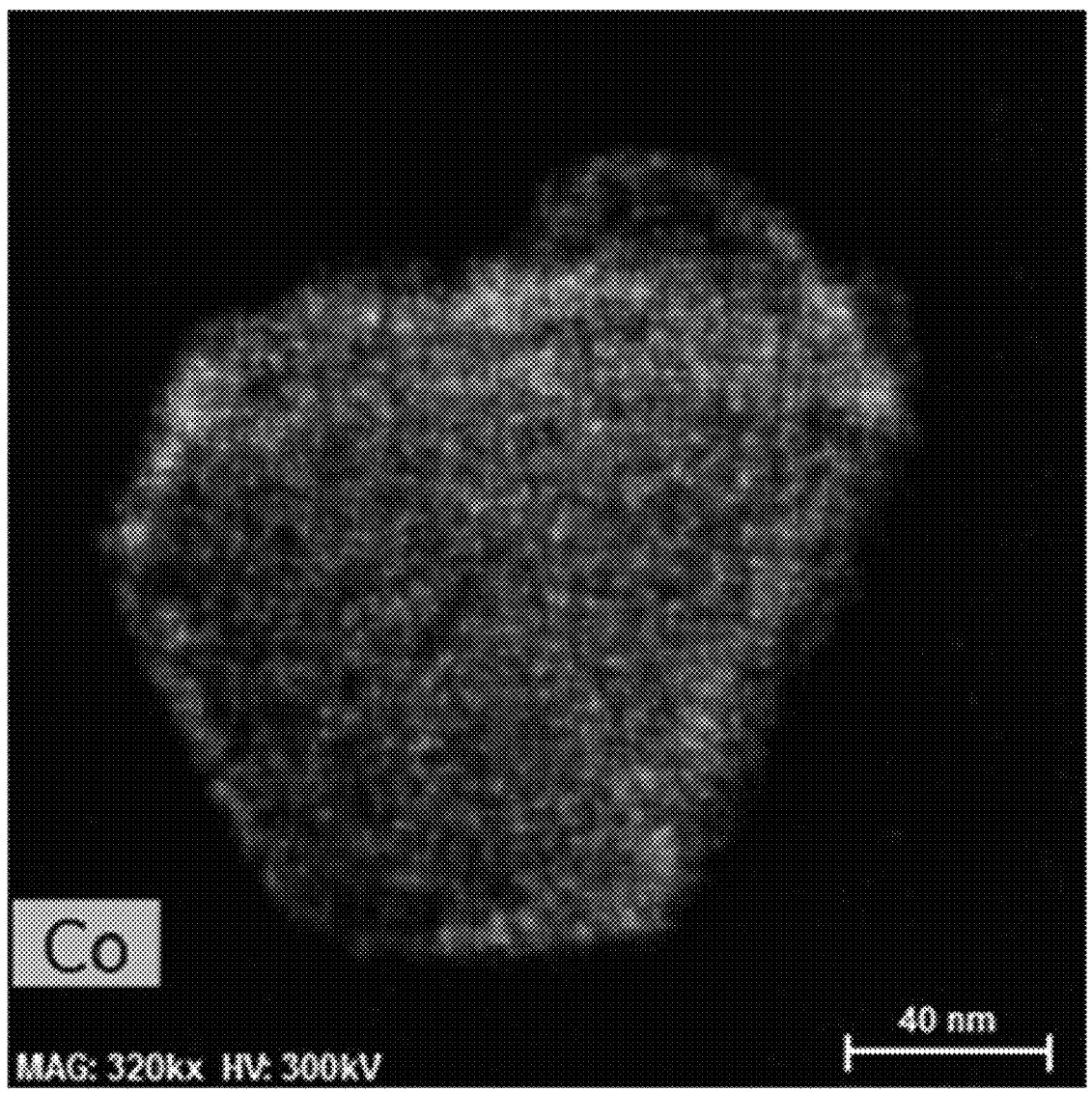
Figure 11D:
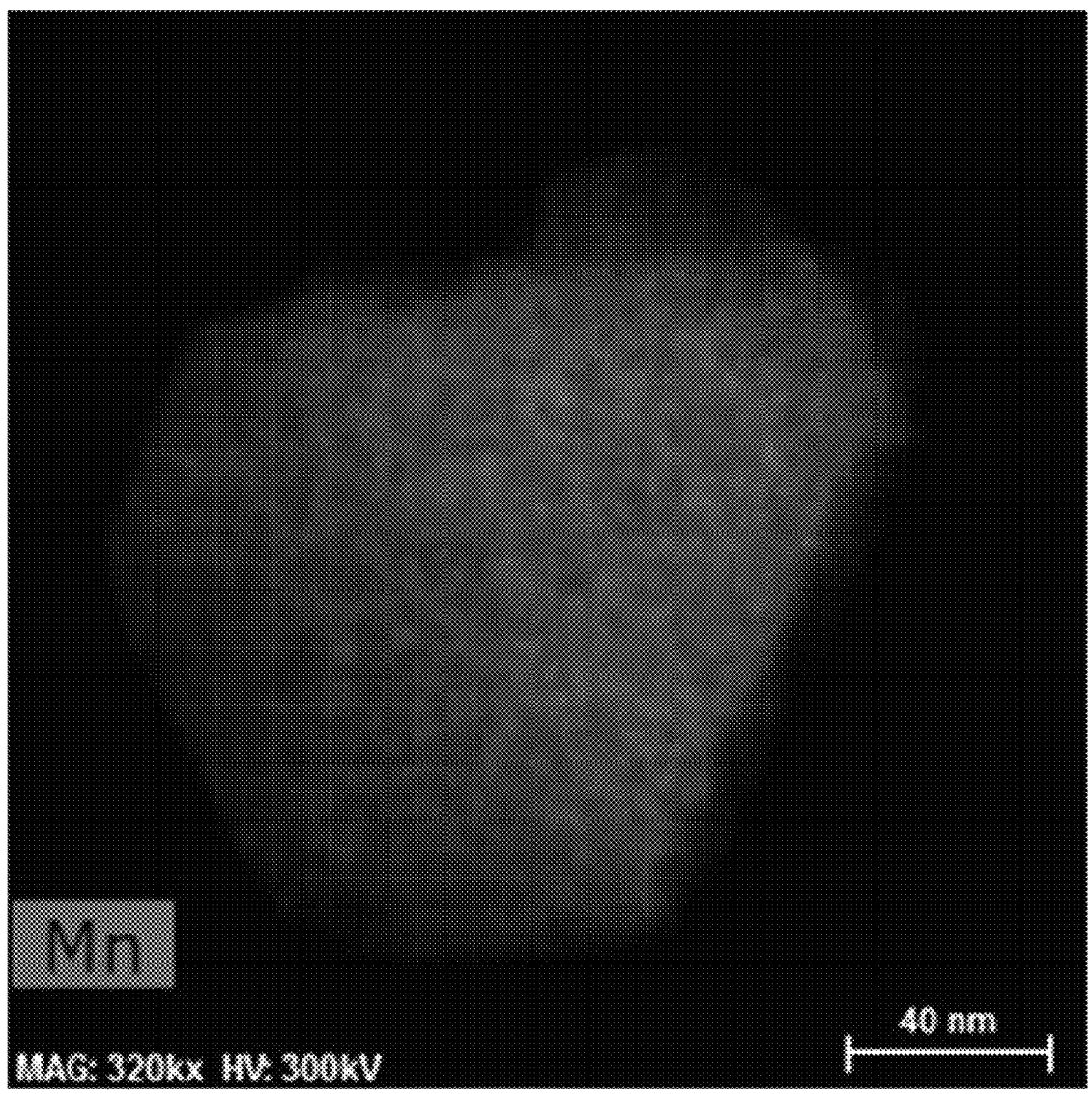
Figure 11E:
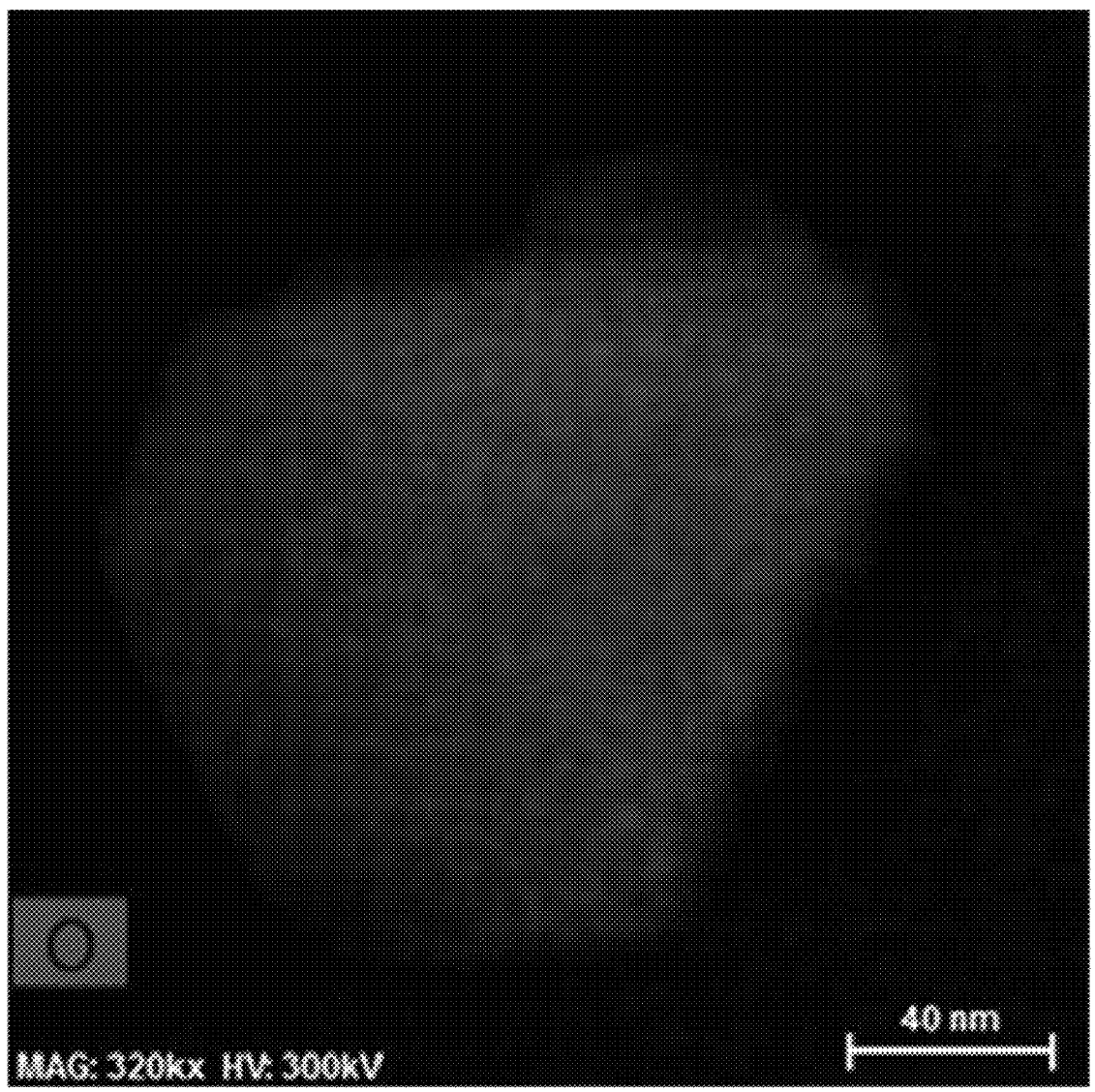
Figure 11F:
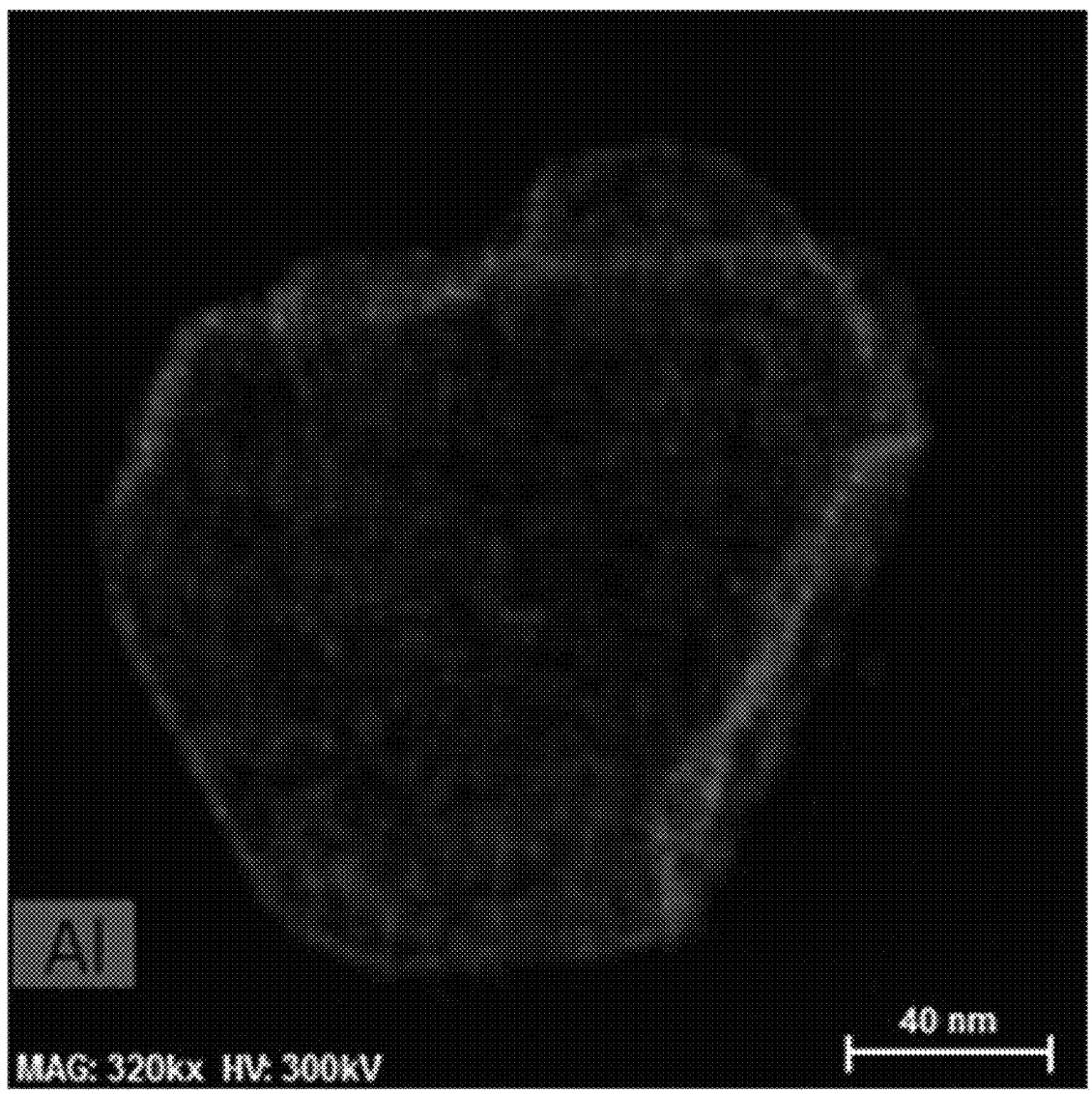
Figure 11G:
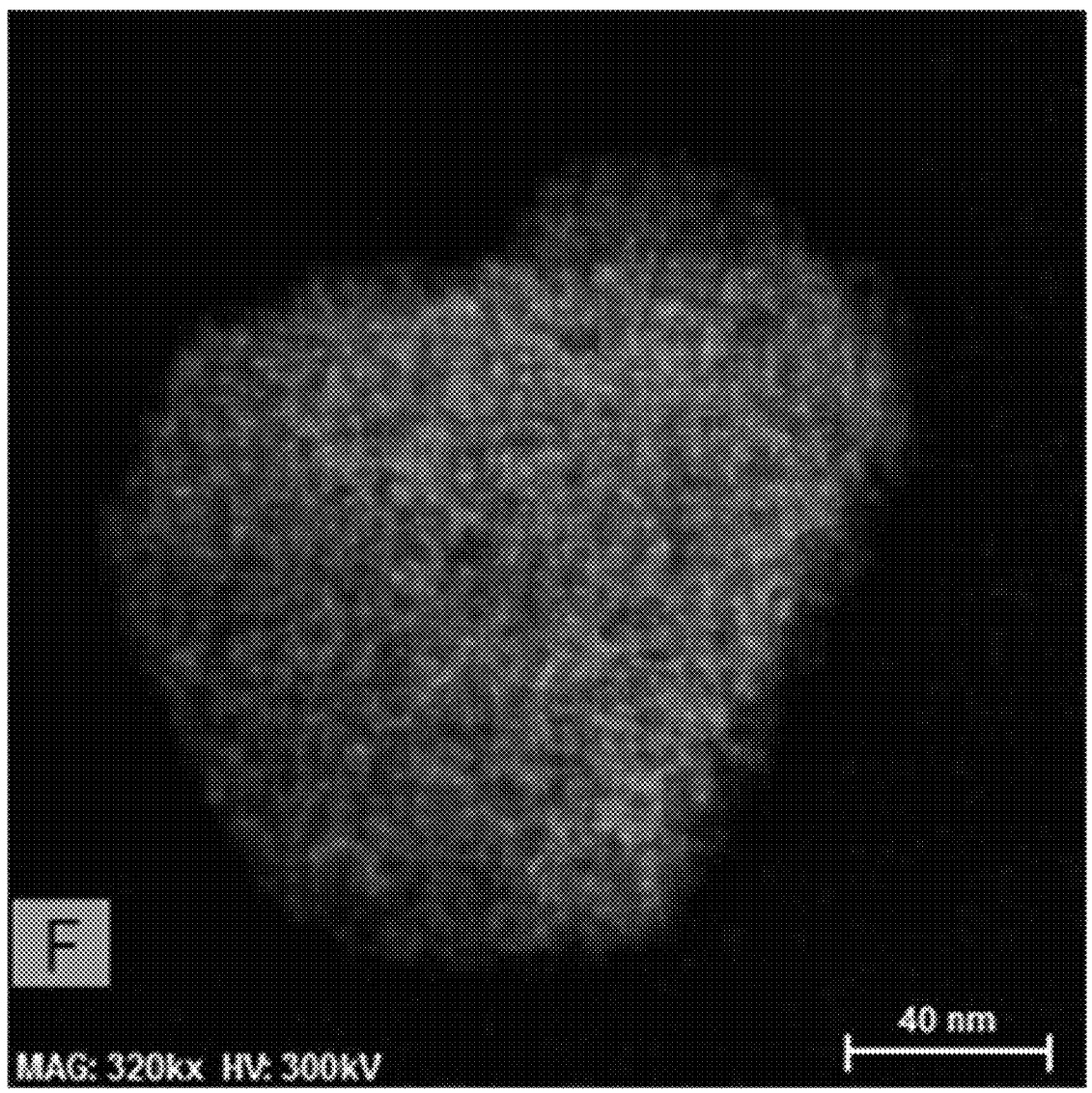
Figure 11H:
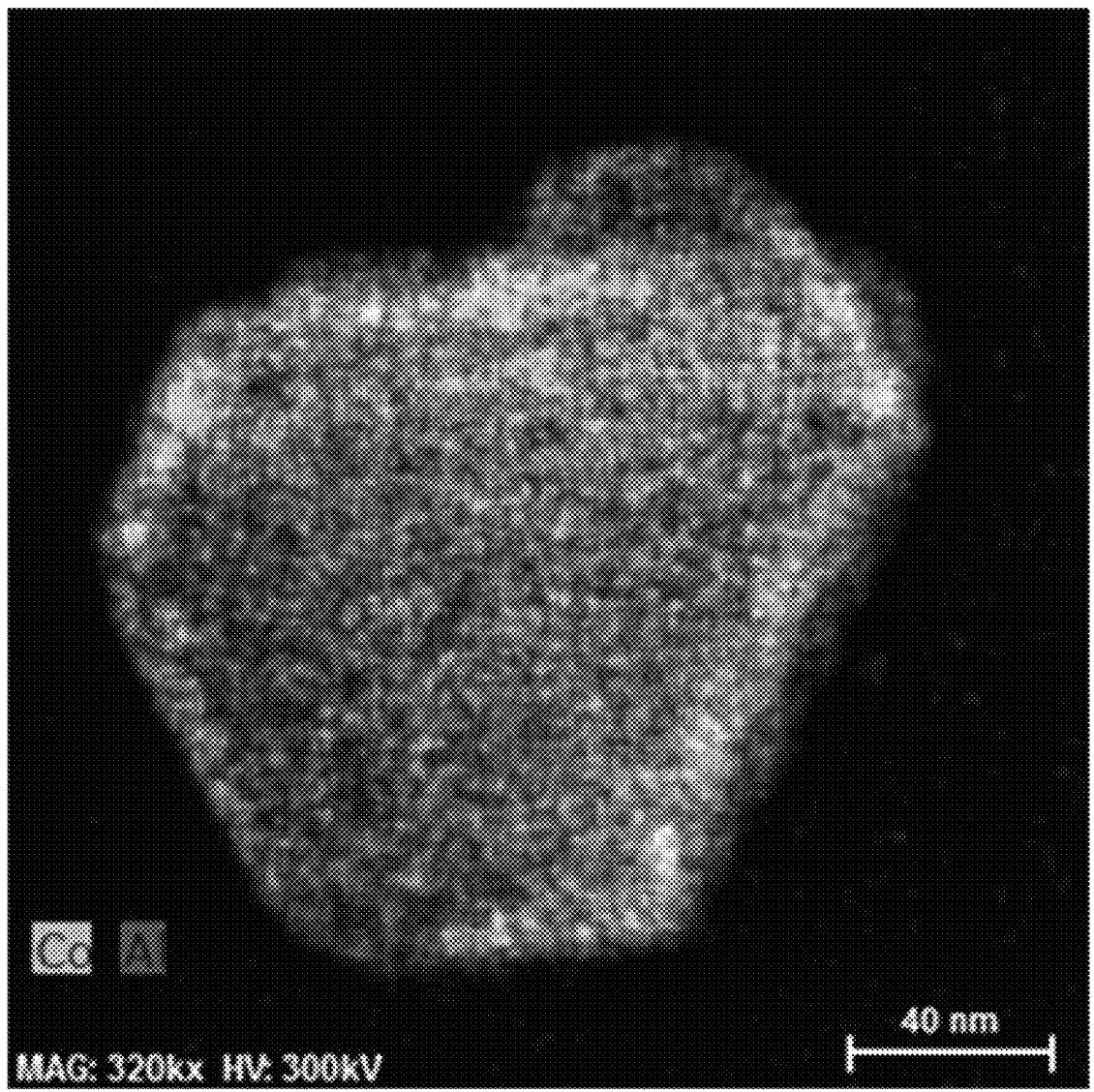

Referring to the results of the TEM/EDS mapping, it may be seen that aluminum was distributed on a surface of lithium composite oxide containing cobalt, and thus existence of the coating layer containing aluminum oxide ($Al_2O_3$) was confirmed. Referring to the results of the XPS analysis of FIGS. 5A to 5J, and the results of the EDS analysis of FIGS. 11A to 11H, particularly FIG. 11H, it may be seen that the cathode active material prepared in Example 1 had the coating layer containing lithium fluoride and aluminum oxide.

Evaluation Example 11: Charging/Discharging Characteristics (Discharge Voltage Drop)

1) Examples 12 to 14 and Comparative Example 3

The coin-half cells prepared in Examples 12 to 14 and Comparative Example 3 were charged with a constant current of 0.1 C until a voltage of each of the cells was 4.5 V, and were discharged with a constant current of 0.1 C until a voltage of each of the cells was 2.0 V.

From the $2^{nd}$ cycle of the charging/discharging, the cells were each charged with a constant current of 0.5 C until a voltage of each of the cells was 4.5 V (4.5V CC/CV 0.5 C), and then were discharged with a constant current of 0.2 C/1 C/2 C until a voltage of each of the cells was 2.0 V (2.0V, 0.2 C/1 C/2 C).

The cycle was performed by charging with a constant current of 1 C until a voltage of each of the cells was 4.5 V (4.5 V CC 1 C) and discharging with a constant current of 1 C until a voltage of each of the cells was 2.0 V (2.0 V 1 C). The charging/discharging cycle was repeated 50 times.

The voltage decay was calculated by using Equation 4, and the results are shown in Table 8.

$$\text{Discharge voltage drop [mV]=[Average discharge voltage after } 50^{th} \text{ cycle–average discharge voltage after } 1^{st} \text{ cycle]} \quad \text{Equation 4}$$

TABLE 8

|  | Discharge voltage drop (Δ)(mV) |
| --- | --- |
| Example 12 | −62.8 |
| Example 13 | −61.3 |
| Example 14 | −56.2 |
| Comparative Example 3 | −63.9 |

As shown in Table 8, as amounts of aluminum oxide and lithium fluoride, which are materials forming a coating layer on a surface of a lithium composite oxide, increased, voltage drop of the coin-half cells was inhibited.

According to one or more exemplary embodiments, a side reaction between an electrolyte and a cathode is suppressed and almost no structural change occurs in a composite cathode active material during high voltage charging of the lithium battery, and thus structural stability of the composite cathode active material increases. When a cathode including the composite cathode active material is used, a lithium battery may have improved cycle characteristics and rate capability.

It should be understood that exemplary embodiments described herein should be considered in a descriptive sense only and not for purposes of limitation. Descriptions of features or aspects within each exemplary embodiment should be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A composite cathode active material for a lithium battery comprising:
   a lithium composite oxide;
   a coating layer comprising a metal oxide and a lithium fluoride, wherein the coating layer is disposed on at least a portion of a surface of the lithium composite oxide; and
   a spinel phase between the lithium composite oxide and the coating layer,
   wherein a total amount of the metal oxide and the lithium fluoride is in a range of about 3 parts by weight to about 10 parts by weight, based on 100 parts by weight of the composite cathode active material,
   wherein the lithium composite oxide is a layered oxide,
   wherein a mole ratio of the metal oxide to the lithium fluoride in the coating layer is in a range of about 1:1.5 to about 1.2, and
   wherein the coating layer is in the form of a continuous layer.

2. The composite cathode active material of claim 1, wherein the coating layer is a single layer comprising a composite comprising the metal oxide and the lithium fluoride or a mixture comprising the metal oxide and the lithium fluoride.

3. The composite cathode active material of claim 1, wherein the metal oxide is at least one of $Al_2O_3$, $Bi_2O_3$, $B_2O_3$, $ZrO_2$, $MgO$, $Cr_2O_3$, $MgAl_2O_4$, $Ga_2O_3$, $SiO_2$, $SnO_2$, $CaO$, $SrO$, $BaO$, $Y_2O_3$, $TiO_2$, $Fe_2O_3$, $MoO_3$, $MoO_2$, $CeO_2$, $La_2O_3$, $ZnO$, or $LiAlO_2$.

4. The composite cathode active material of claim 1, wherein the composite cathode active material does not have a peak between about 23 degrees two-theta to about 27 degrees two-theta, when analyzed by X-ray powder diffraction.

5. The composite cathode active material of claim 1, wherein the coating layer does not comprise $AlF_3$.

6. The composite cathode active material of claim 1, wherein the coating layer consists of the metal oxide and the lithium fluoride.

7. The composite cathode active material of claim 1, wherein the composite cathode active material has a peak between about 72 electron volts to about 75 electron volts, and has a peak between about 683 electron volts to about 688 electron volts, when analyzed by X-ray photoelectron spectroscopy.

8. The composite cathode active material of claim 1, wherein a total amount of the metal oxide and the lithium fluoride is in a range of 3 parts by weight to about 10 parts by weight, based on 100 parts by weight of the composite cathode active material.

9. The composite cathode active material of claim 1, wherein the lithium composite oxide comprising the layered oxide comprises at least one compound represented by Formulae 1 to 3:

$$Li_aNi_xCo_yMn_zM_cO_{2-e}A_e \quad \text{Formula 1}$$

wherein, in Formula 1,
$1.0<a\leq1.4$, $0<x<1$, $0\leq y<1$, $0<z<1$, $0\leq c<1$, $0<x+y+z+c<1$, and $0\leq e<1$;
M is at least one of V, Mg, Ga, Si, W, Mo, Fe, Cr, Cu, Zn, Ti, Al, or B; and
A is at least one anion element of F, S, Cl, or Br, $$Li[Co_{1-x}M_x]O_{2-a}A_a \quad \text{Formula 2}$$

wherein, in Formula 2,
$0\leq a\leq0.1$ and $0\leq x\leq0.1$;
M is at least one metal of Mg, Al, Ni, Mn, Zn, Fe, Cr, Ga, Mo, or W; and
A is at least one anion element of F, S, Cl, or Br, $$Li_{1+a}[Ni_{1-x}M_x]O_{2-b}A_b \quad \text{Formula 3}$$

wherein, in Formula 3,
$0.01\leq a\leq0.2$, $0\leq b\leq0.1$, and $0.01\leq x\leq0.5$;
M is at least one metal of Mg, Al, Co, Mn, Zn, Fe, Cr, Ga, Mo, or W; and
A is at least one anion element of F, S, Cl, or Br.

10. The composite cathode active material of claim 1, wherein the lithium composite oxide comprising the layered oxide comprises at least one compound represented by Formula 7:

$$Li_aNi_xCo_yMn_zM_cO_{2-b}A_b \quad \text{Formula 7}$$

wherein, in Formula 7,
$1.0<a\leq1.4$, $0<x<1$, $0\leq y<1$, $0<z<1$, $0\leq c<1$, $0<x+y+z+c<1$, and $0\leq b\leq0.1$;
M is at least one of V, Mg, Ga, Si, W, Mo, Fe, Cr, Cu, Zn, Ti, Al, or B; and
A is at least one anion element of F, S, Cl, or Br.

11. The composite cathode active material of claim 1, wherein a thickness of the coating layer is in a range of about 1 nanometer to about 1 micrometer.

12. The composite cathode active material of claim 1, wherein the lithium composite oxide comprising the layered oxide is at least one of $Li_{1.167}Ni_{0.542}Co_{0.083}Mn_{0.208}O_2$, $Li_{1.130}Ni_{0.565}Co_{0.088}Mn_{0.217}O_2$, $Li_{1.167}Ni_{0.5}Co_{0.125}Mn_{0.208}O_2$, $Li_{1.130}Ni_{0.522}Co_{0.130}Mn_{0.217}O_2$, $Li_{1.167}Ni_{0.5}Co_{0.1665}Mn_{0.1665}O_2$, $Li_{1.130}Ni_{0.522}Co_{0.174}Mn_{0.174}O_2$, $Li_{1.167}Ni_{0.458}Co_{0.083}Mn_{0.292}O_2$, $Li_{1.130}Ni_{0.478}Co_{0.087}Mn_{0.305}O_2$, $Li_{1.167}Ni_{0.542}Co_{0.083}Mn_{0.208}O_{1.99}F_{0.01}$, $Li_{1.130}Ni_{0.565}Co_{0.088}Mn_{0.217}O_{1.99}F_{0.01}$, or $Li_{1.167}Ni_{0.5}Co_{0.125}Mn_{0.208}O_{1.99}F_{0.01}$.

13. The composite cathode active material of claim 1, wherein the coating layer comprises a composite that includes $Al_2O_3$ and LiF.

14. A method of preparing a composite cathode active material for a lithium battery, the method comprising:
   mixing a metal oxide precursor, a lithium composite oxide, a fluoride precursor, and a solvent to prepare a reaction product;
   drying the reaction product; and
   heat-treating the dried reaction product to prepare the composite cathode active material,
   wherein the composite cathode active material comprises a lithium composite oxide, a coating layer comprising a metal oxide and a lithium fluoride, wherein the coating layer is disposed on at least a portion of a surface of the lithium composite oxide, and a spinel phase between the lithium composite oxide and the coating layer, wherein a total amount of the metal oxide and the lithium fluoride is in a range of about 3 parts by weight to about 10 parts by weight, based on 100 parts by weight of the composite cathode active material, wherein a mole ratio of the metal oxide to the lithium fluoride is in a range of about 1:1.5 to 1:2, and wherein the coating layer is in the form of a continuous layer.

15. The method of claim 14, wherein the drying is performed at a temperature in a range of about 50° C. to about 100° C.

16. The method of claim 14, wherein the heat-treating is performed at a temperature in a range of about 400° C. to about 700° C. and in an inert gas atmosphere or in an oxidative gas atmosphere.

17. The method of claim 14, wherein the heat-treating is performed at a temperature in a range of about 450° C. to about 700° C. and in an inert gas atmosphere or in an oxidative gas atmosphere.

18. The method of claim 14, wherein the metal oxide precursor comprises at least one selected from an alkoxide, a sulfate, a nitrate, an acetate, a chloride, and a phosphate of at least one selected from aluminum, bismuth, boron, zirconium, magnesium, chrome, gallium, silicon, tin, calcium, strontium, barium, yttrium, titanium, iron, molybdenum, cerium, lanthanum, and zinc.

19. The method of claim 14, wherein the fluoride precursor comprises at least one selected from ammonium fluoride, ammonium hydrogen fluoride, cesium fluoride, potassium fluoride, and sodium fluoride.

20. The method of claim 14, wherein a washing process is not performed before the drying of the reacted product.

21. The method of claim 14, wherein the mixing of the metal oxide precursor, the lithium composite oxide, the fluoride precursor, and the solvent comprises mixing the metal oxide precursor, the fluoride precursor, and the solvent and then adding the lithium composite oxide to the mixture of the metal oxide precursor and the fluoride precursor, and the solvent; or mixing the metal oxide precursor, the lithium composite oxide, and the solvent, and then adding the fluoride precursor to the mixture of the metal oxide precursor and the lithium composite oxide, and the solvent.

22. A cathode for a lithium battery comprising the composite cathode active material of claim 1.

23. A lithium battery comprising the cathode of claim 22.

24. The composite cathode active material of claim 1, wherein the metal oxide comprises aluminum.

25. A composite cathode active material for a lithium battery comprising:

a lithium composite oxide;

a coating layer comprising a metal oxide and a lithium fluoride, wherein the coating layer is disposed on at least a portion of a surface of the lithium composite oxide, and a spinel phase between the lithium composite oxide and the coating layer, wherein a total amount of the metal oxide and the lithium fluoride is in a range of about 3 parts by weight to about 10 parts by weight, based on 100 parts by weight of the composite cathode active material, wherein the lithium composite oxide is a layered oxide, wherein a mole ratio of the metal oxide to the lithium fluoride in the coating layer is in a range of about 1:1.5 to about 1:1.15, and wherein the coating layer is in the form of a continuous layer.

26. The composite cathode active material of claim 25, wherein the metal oxide comprises aluminum.

* * * * *